(12) United States Patent
Zhang et al.

(10) Patent No.: US 7,617,365 B2
(45) Date of Patent: Nov. 10, 2009

(54) SYSTEMS AND METHODS TO AVOID DEADLOCK AND GUARANTEE MIRROR CONSISTENCY DURING ONLINE MIRROR SYNCHRONIZATION AND VERIFICATION

(75) Inventors: Chao Zhang, Milpitas, CA (US); Robert Tower Frey, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 389 days.

(21) Appl. No.: 10/931,325

(22) Filed: Aug. 31, 2004

(65) Prior Publication Data
US 2006/0010299 A1 Jan. 12, 2006

Related U.S. Application Data

(63) Continuation-in-part of application No. 10/837,248, filed on Apr. 30, 2004, and a continuation-in-part of application No. 10/833,438, filed on Apr. 28, 2004.

(51) Int. Cl.
G06F 13/14 (2006.01)
G06F 15/16 (2006.01)

(52) U.S. Cl. ...................... 711/141; 709/246
(58) Field of Classification Search ........ None
See application file for complete search history.

(56) References Cited

U.S. PATENT DOCUMENTS 6,148,421 A * 11/2000 Hoese et al. ................ 714/50
7,127,566 B2 * 10/2006 Ramakrishnan et al. ...... 711/152
2003/0093567 A1 * 5/2003 Lolayekar et al. ........... 709/246
2005/0076091 A1 * 4/2005 Missimer et al. ............ 709/217
2005/0192967 A1 * 9/2005 Basavaiah et al. ............ 707/10

OTHER PUBLICATIONS

Robert W. Kembel, Arbitrated Loop, pp. 130-132, Connectivity Solutions, 1996.*

* cited by examiner

Primary Examiner—Sanjiv Shah
Assistant Examiner—Duc T Doan
(74) Attorney, Agent, or Firm—Barry N. Young

(57) ABSTRACT

Systems and methods can provide mirrored virtual targets and online synchronization and verification of the targets while avoiding deadlock, inconsistencies between members of the target, and false verification failures. A lock within the storage switch can limit the number of outstanding commands for a physical target to one during synchronization and verification operations. In one embodiment, a lock can be implemented as one or more resource tables maintaining an indication of the number of transfer ready signals available from physical targets. During typical write operations, deadlock can be avoided by determining whether each physical target for the mirrored operation can issue a transfer ready signal prior to issuing a command to the physical target. When a synchronization or verification operation begins, the maximum available number of transfer ready signals for each target can be decremented to one in order to limit the total number of outstanding commands for each target to one.

29 Claims, 33 Drawing Sheets

(Classification - PACE - iSCSI - ingress)

(Classification - PACE - iSCSI - egress)

(classification - PACE - FCP - ingress)

(classification - PACE - FCP - egress)

(Classification - PPU - ingress)

(Classification - PPU - egress)

(Virtualization Ingress - cmd)

(Virtualization - Egress - cmd)

(Virtualization - Ingress - R2T/XFR_RDY)

(Virtualization - Egress - R2T/XFR_RDY)

(Virtualization - Ingress - write data packet)

(Virtualization - Egress - write data pkt)

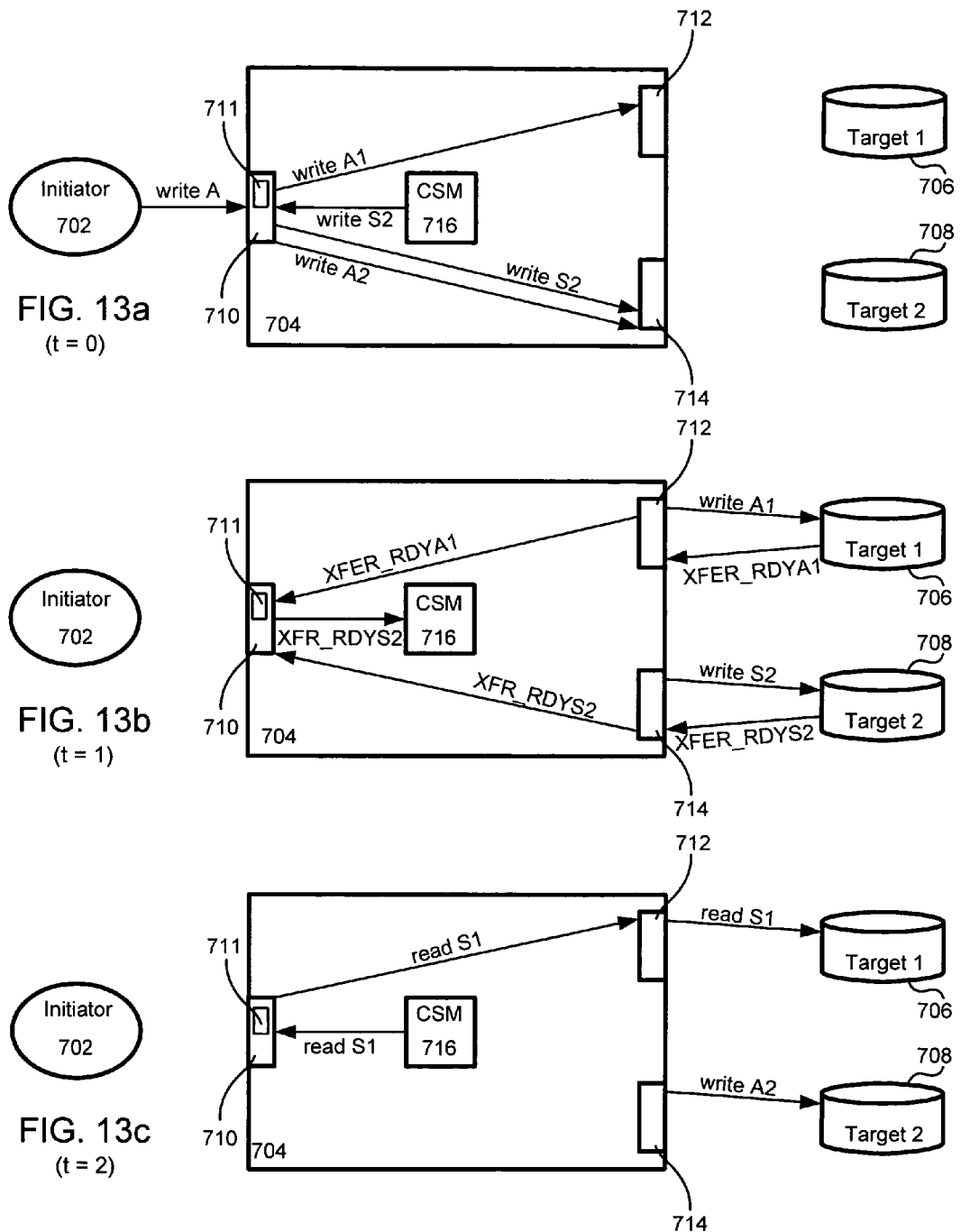

(t = 0)

(t=1)

(t=2)

(t=3)

(t=0)

(t=1)

(t=2)

(t=1)

(t=1)

(t=2)

(t=3)

(t=0)

(t=1)

(t=2)

(t=3)

(t=1)

(t=2)

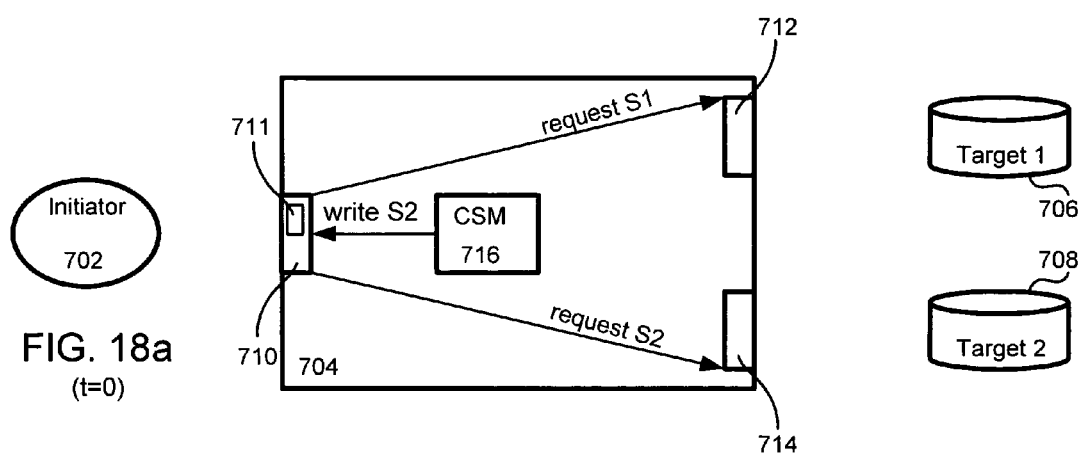
FIG. 18a (t=0)
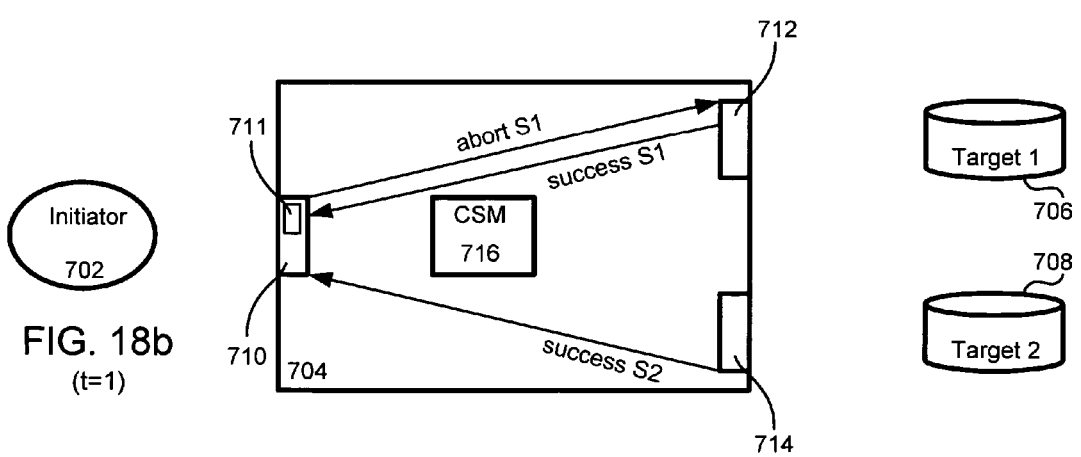
FIG. 18b (t=1)

(t=2)

(t=3)

(t=1)

(t=2)

(t=0)

(t=1)

(t=2)

(t=3)

(t=1)

(t=2)

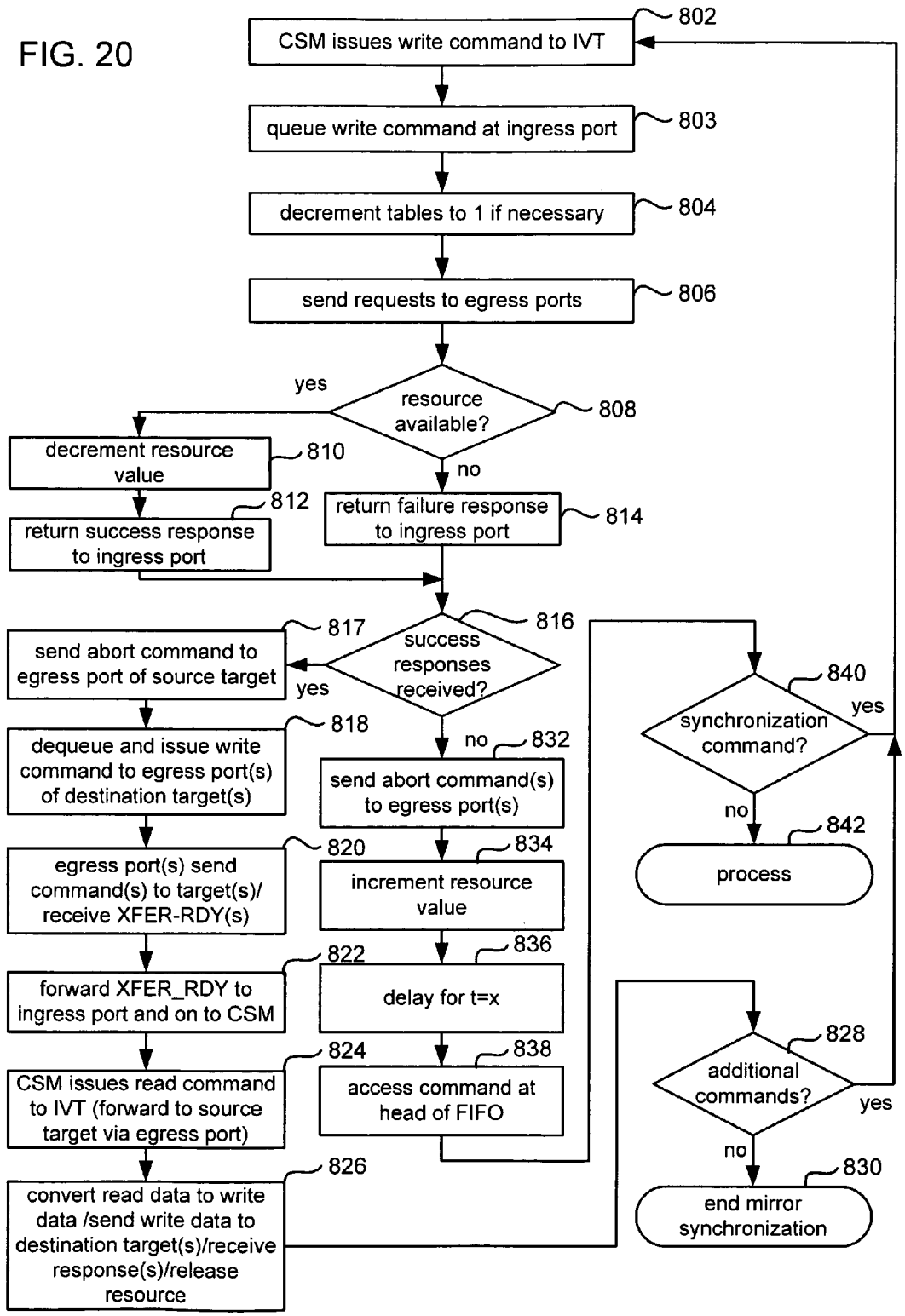

US 7,617,365 B2

SYSTEMS AND METHODS TO AVOID DEADLOCK AND GUARANTEE MIRROR CONSISTENCY DURING ONLINE MIRROR SYNCHRONIZATION AND VERIFICATION

PRIORITY INFORMATION

This application is a continuation-in-part application of:

U.S. patent application Ser. No. 10/833,438, entitled PROACTIVE TRANSFER READY RESOURCE MANAGEMENT IN STORAGE AREA NETWORKS, filed Apr. 28, 2004, incorporated herein by reference in its entirety; and U.S. patent application Ser. No. 10/837,248, entitled ONLINE INITIAL MIRROR SYNCHRONIZATION AND VERIFICATION IN STORAGE AREA NETWORKS, filed Apr. 30, 2004, incorporated herein by reference in its entirety.

CROSS-REFERENCE TO RELATED APPLICATIONS

The following applications are cross-referenced and incorporated by reference herein in their entirety:

U.S. patent application Ser. No. 10/051,321, entitled STORAGE SWITCH FOR STORAGE AREA NETWORK, filed Jan. 18, 2002;

U.S. patent application Ser. No. 10/051,396, entitled VIRTUALIZATION IN A STORAGE SYSTEM, filed Jan. 18, 2002; and U.S. patent application Ser. No. 10/050,974, entitled POOLING AND PROVISIONING STORAGE RESOURCES IN A STORAGE NETWORK, filed Jan. 18, 2002, now U.S. Pat. No. 6,976,134.

BACKGROUND OF THE INVENTION

1. Field of the Invention

The present invention relates generally to storage area networks.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SANs has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can included servers, personal computing devices, and other devices capable of providing write commands and requests, are generally interconnected via various switches and/or appliances. The connections to the switches and appliances are usually Fibre Channel or iSCSI.

A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s). Accordingly, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

Some storage area networks provide for increased availability and reliability of data by performing so called mirroring operations whereby multiple copies of data are maintained in the network. These operations typically involve maintaining data associated with a volume in two or more physical devices connected to a single switch to provide redundant access to the data should one target become unavailable. For example, a mirrored virtual target may route all data to at least two distinct physical storage locations such as by provisioning the target to include mirrored members corresponding to distinct physical devices or locations.

To establish a mirrored virtual target, the data of a selected physical device is typically written to one or more additional storage devices corresponding to different members of the mirrored virtual target in what is often referred to as a synchronization operation. Additionally, the consistency of data storage among mirrored members is often performed by reading the data from one or more physical devices corresponding to a first member of the mirrored target and verifying that data against the data stored in the physical devices corresponding to the remaining mirrored members in what is often referred to as a verification operation.

In storage switches that route data between devices without buffering the data within the switch, there is an inherent risk that the physical devices and/or storage switch (and the ongoing operations occurring at each) can become deadlocked. For example, targets and/or a switch can become deadlocked while reading the data from a source target and writing it to one or more destination targets to synchronize the targets. Similarly, targets and/or a switch can become deadlocked while verifying the data of a source target against the data of destination targets. In addition to deadlock, inconsistencies and false verification failures can occur during these operations.

Accordingly, there is a need for a system and method in storage area networks to address these identified deficiencies and provide for increased reliability and availability of physical devices, switches, and mirrored virtual targets.

SUMMARY OF THE INVENTION

In accordance with various embodiments, systems, methods, and articles of manufacture can provide and manage mirrored virtual targets. A storage switch in accordance with embodiments avoids deadlock, inconsistencies between mirrored member of a virtual target, and false verification failures by limiting the number of pending or outstanding commands for physical targets corresponding to mirrored members during synchronization and verification operations. In accordance with embodiments, a storage switch can synchronize and verify members of a mirrored virtual target while the mirrored target remains online to receive commands for the mirrored virtual target from initiating devices.

In accordance with one embodiment, a method of synchronizing data storage such as the members of a mirrored virtual target or virtual logical unit is provided that includes determining whether at least one command is pending for at least one physical target provisioned as at least one member of a mirrored virtual target, and providing a synchronization command to the at least one physical target only if no command is pending at the at least one physical target.

In one embodiment, the method can further include locking the at least one physical target when a command is pending for said at least one physical target such that the step of determining whether at least one command is pending for the at least one physical target includes determining whether the at least one physical target is locked.

An indication associated with the at least one physical target can be provided that includes a first value to indicate that at least one command is pending for the at least one physical target and a second value to indicate that no commands are pending for the at least one physical target.

In one embodiment, the at least one physical target includes a source physical target provisioned as a first member of the mirrored virtual target and at least one destination physical target provisioned as at least one second member of the mirrored virtual target. One or more tables or other indication(s) associated with the source physical target and/or the destination physical target(s) can maintain values to indicate whether at least one command is pending for the respective target. A synchronization command is only provided if no command is pending at the source physical target and the destination physical target(s). In one embodiment, determining whether commands are pending can include providing a first request to a first egress port in communication with the source physical target and at least one second request to at least one second egress port in communication with the at least one destination physical target, receiving a first success response if no commands are pending at the source physical target, receiving a first failure response if a command is pending at the source physical target, receiving a second success response if no commands are pending at the at least one destination physical target, and receiving a second failure response if a command is pending at the at least one destination physical target.

In one embodiment, a table associated with the at least one physical target maintains a value indicative of a number of transfer ready signals available from the at least one physical target. The value has a maximum value indicative of a maximum number of transfer ready signals available from the at least one physical target. The maximum value can be decremented to one prior to determining whether at least one command is pending for the at least one physical target during synchronization or verification operations. The step of determining whether at least one command is pending for the at least one physical target can then include determining from the table whether a transfer ready signal is available from the at least one physical target.

In one embodiment, a storage switch includes a memory adapted to maintain an indication of whether at least one command is pending for at least one physical target provisioned as a member of a mirrored virtual target and at least one processing unit in communication with the memory. The at least one processing unit determines from the memory whether at least one command is pending for the at least one physical target before the storage switch provides a synchronization command to the at least one physical target.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

Other features, aspects, and objects of the invention can be obtained from a review of the specification, the figures, and the claims.

BRIEF DESCRIPTION OF THE DRAWINGS

FIGS. 13a-13c depict a block diagram of a storage area network and a potential deadlock scenario arising during mirror synchronization;

FIGS. 18a-18f depict a block diagram of a storage area network including a command and data flow of a synchronization operation for a mirrored virtual target in accordance with one embodiment;

FIG. 20 is a flowchart depicting a synchronization operation for a mirrored virtual target in accordance with one embodiment.

DETAILED DESCRIPTION

Figure 1:
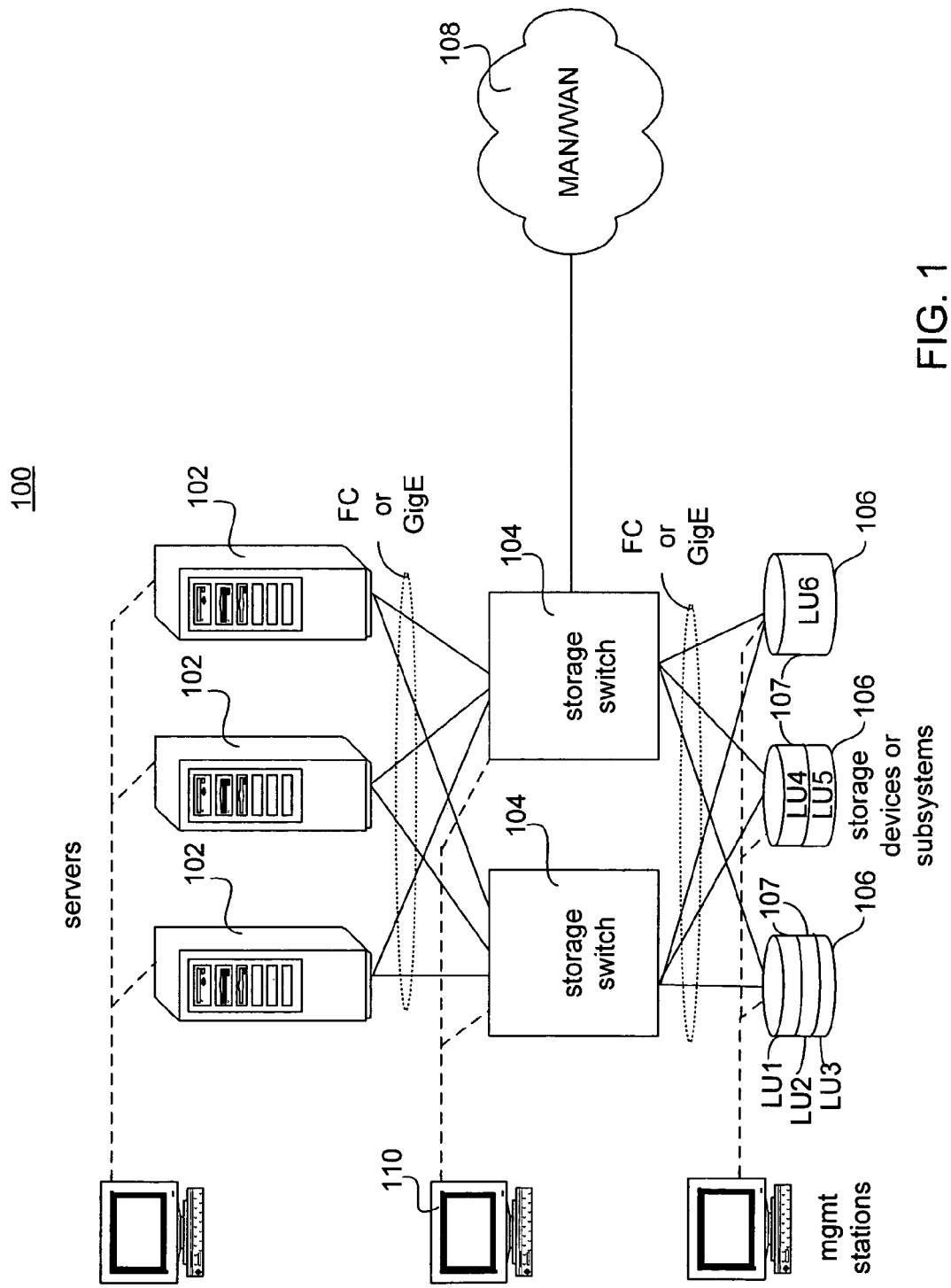
FIG. 1 is a generalized functional block diagram of a storage area network in accordance with one embodiment.

An exemplary system 100 including a storage switch in accordance with one embodiment is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by the Infiniband Trade Association, or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" (or "virtual logical unit") come from the fact that storage space allocated per subscription can be anywhere on one or more physical storage target devices connecting to a storage switch 104. The physical space can be provisioned as a "virtual target" or "virtual logical unit (VLU)" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target or VLU may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 2:
FIG. 2 is a generalized functional block diagram of a storage switch in accordance with one embodiment.

FIG. 2 illustrates a functional block diagram of a storage switch 104 in accordance with an embodiment of the invention. More information regarding the details of a storage switch such as storage switch 104 and its operation can be found in U.S. patent application Ser. No. 10/051,321. In one embodiment, the storage switch 104 includes a plurality of linecards 202, 204, and 206, a plurality of fabric cards 208, and two system control cards 210, each of which will be described in further detail below. Although an exemplary storage switch is illustrated, it will be appreciated that numerous other implementations and configurations can be used in accordance with various embodiments.

System Control Cards. Each of the two System Control Cards (SCCs) 210 connects to every line card 202, 204, 206. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the Ethernet connections, the SCC also initiates various storage services, e.g., snapshot and replicate.

In addition, the SCC maintains a database 212 that tracks configuration information for the storage switch as well as all virtual targets and physical devices attached to the switch, e.g., servers and storage devices. In addition, the database keeps information regarding usage, error and access data, as well as information regarding different domains and default sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 210 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 212.

Fabric Cards. In one embodiment of switch 104, there are three fabric cards 208, although other embodiments could have more or fewer fabric cards. Each fabric card 208 is coupled to each of the linecards 202, 204, 206 in one embodiment and serves to connect all of the linecards together. In one embodiment, the fabric cards 208 can each handle maximum traffic when all linecards are populated. Such traffic loads handled by each linecard are up to 160 Gbps in one embodiment although other embodiments could handle higher or lower maximum traffic volumes. If one fabric card 208 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 202, Fibre Channel (FC) cards 204, and WAN cards 206. Other embodiments may include more or fewer types of linecards. The GigE cards 202 are for Ethernet connections, connecting in one embodiment to either iSCSI servers or iSCSI storage devices (or other Ethernet based devices). The FC cards 204 are for Fibre Channel connections, connecting to either Fibre Channel Protocol (FCP) servers or FCP storage devices. The WAN cards 206 are for connecting to a MAN or WAN.

Figure 3:
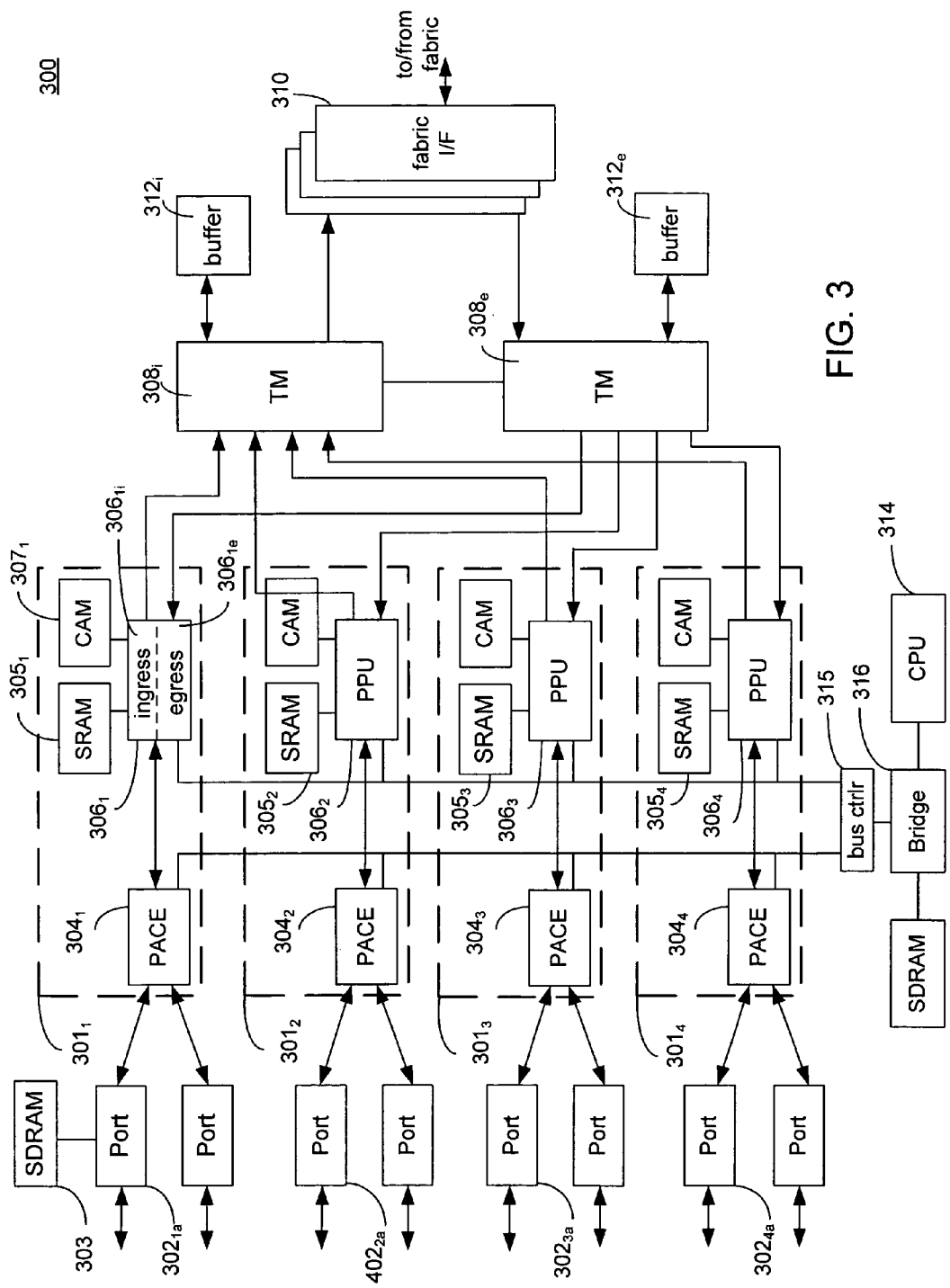
FIG. 3 is a generalized functional block diagram of a linecard used in a storage switch in accordance with one embodiment.

FIG. 3 illustrates a functional block diagram of a generic line card 300 used in a storage switch 104 in accordance with one embodiment. Line card 300 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 300 includes a plurality of ports 302. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 302 has an associated memory 303. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 301. In one embodiment the SPU rapidly processes the data traffic allowing for wire-speed operations. In one embodiment, each SPU includes several elements: a Packet Aggregation and Classification Engine (PACE) 304, a Packet Processing Unit (PPU) 306, an SRAM 305, and a CAM 307. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 304. As illustrated, the PACE 304 aggregates two ports into a single data channel having twice the bandwidth. For instance, the PACE 304 aggregates two 1 Gb ports into a single 2 Gb data channel. The PACE can classify each received packet into a control packet or a data packet. Control packets are sent to the CPU 314 for processing, via bridge 316. Data packets are sent to a Packet Processing Unit (PPU) 306, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $306_1$, while all four PACEs in the illustrated embodiment share a path to the CPU 314, which in one embodiment is a 104 MHz/32 (3.2 Gbps) bit data path.

Packet Processing Unit (PPU). Each PPU such as PPU $306_1$ performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $306_{1i}$ and an egress PPU $306_{1e}$, which both run concurrently. The ingress PPU $306_{1i}$ receives incoming data from PACE 304, and sends data to the Traffic Manager $308_i$ while the egress PPU $306_{1e}$ receives data from Traffic Manager 308, and sends data to a PACE $304_1$. Although only one PPU 306, is shown in FIG. 3 as having an ingress PPU $306_{1i}$ and an egress PPU $306_{1e}$, it is to be understood that in one embodiment all PPUs 306 will include both an ingress and an egress PPU and that only one PPU is shown in FIG. 3 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 314 of the linecard 300 informs a PPU 306 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU $306_1$ are connected to an SRAM $305_1$ and CAM $307_1$. SRAM $305_1$ can store a VTD and PTD database. A listing of VTD Identifiers (VTD IDs), or addresses, as well as PTD Identifiers (PTD IDs), is also maintained in the PPU CAM $307_1$ for quick accessing of the VTDs. The VTD IDs are indexed (mapped) using a TCP Control Block Index and a LUN. The PTD IDs are indexed using a VTD ID. In addition, for IP routing services, the CAM $307_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 307 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 308 on each linecard 300: one TM $308_i$ for ingress traffic and one TM $308_e$ for egress traffic. The ingress TM receives cells from all four SPUs, in the form of 64-byte data cells, in one embodiment. In such an embodiment, each data cell has 16 bytes of local header and 48 bytes of payload. The header contains a Flow ID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 310 in one embodiment. Other embodiments may operate at 125 Mhz or other speeds. The egress TM receives the data cells from the fabric cards and delivers them to the four SPUs.

Both ingress and egress TMs have a large buffer 312 to queue cells for delivery. Both buffers 312 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 310 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 310.

CPU. On every linecard there is a processor (CPU) 614, which in one embodiment is a PowerPC 750 Cxe. In one embodiment, CPU 314 connects to each PACE with a 3.2 Gb bus, via a bus controller 315 and a bridge 316. In addition, CPU 314 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 314 and the SCC 310 are involved. When a TCP packet is received, and after initial handshaking is performed, a TCP control block is created and stored in the GigE port memory 303. A VTD is also retrieved from an object of the SCC database and stored in the CPU SDRAM 305 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 305. The CPU creates the VTD by retrieving the VTD information stored in its SDRAM and originally obtained from the SCC database. A VTD ID is established in a list of VTD IDs in the SPU CAM 307 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 302 communicates with the PACE 304 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELSs to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 3; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321.

Storage Pools

As shown in FIG. 1, in its physical configuration, a system in accordance with an embodiment of the invention includes a switch 104 coupled to one or more servers 102 and to one or more physical devices 106, i.e., storage devices or subsystems. Each physical target is comprised of one or more logical units (LUs) 107. It is from these LUs that virtual targets or VLUs will ultimately be formed.

Before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. Once a device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 110, wherein the characteristics can then be provided to a switch 104.

Based on the information gathered about the device, all of which is generally invisible to the end user, in one embodiment of the invention the switch classifies the device based on a policy. Once a policy has been determined for a storage device, the LUs for the device are assigned to a storage pool 802, sometimes referred to herein as a "domain." Since each storage device is comprised of one or more LUs, all the LUs of a particular storage device are assigned to the same pool. However, in one embodiment, each LU is considered by the switch as a separate storage node and each LU is described by an LU object in the SCC database. Thus, each pool has as members the LUs. In one embodiment, assignment to a pool is done independent of the protocol under which the physical storage device operates, e.g., iSCSI or Fiber Channel. As will be understood by those of skill in the art, each pool is defined in a switch by a listing for the pool of the LUs assigned to it, which listing is stored in the SCC database in one embodiment. Such a listing may be comprised of pointers to the LU objects.

Generally each pool will be accessible only to users with particular characteristics. For example, a storage pool may be established for those users located in a Building 1, where the pool is entitled "Building 1 Shared Gold Storage Pool." Another exemplary pool may be entitled "Engineering Exclusive Silver Storage Pool" and may be exclusively accessible by the engineering team at a particular company. Of course an infinite variation of pools could be established and those described and illustrated are exemplary only.

In addition, in an embodiment, there are two special pools: a "Default Pool" and a "No Pool." A Default Pool allows access to anyone with access to the storage network. A "No Pool," in contrast, is not generally accessible to users and is only accessible to the switch itself or to the system administrator. Once assigned to a pool, the LUs can be reassigned to different pools by the switch itself or by a system administrator. For instance, an LU may initially be placed in the No Pool, tested, and then later moved to the default pool or other pool.

Provisioning a Virtual Target

Figure 4:
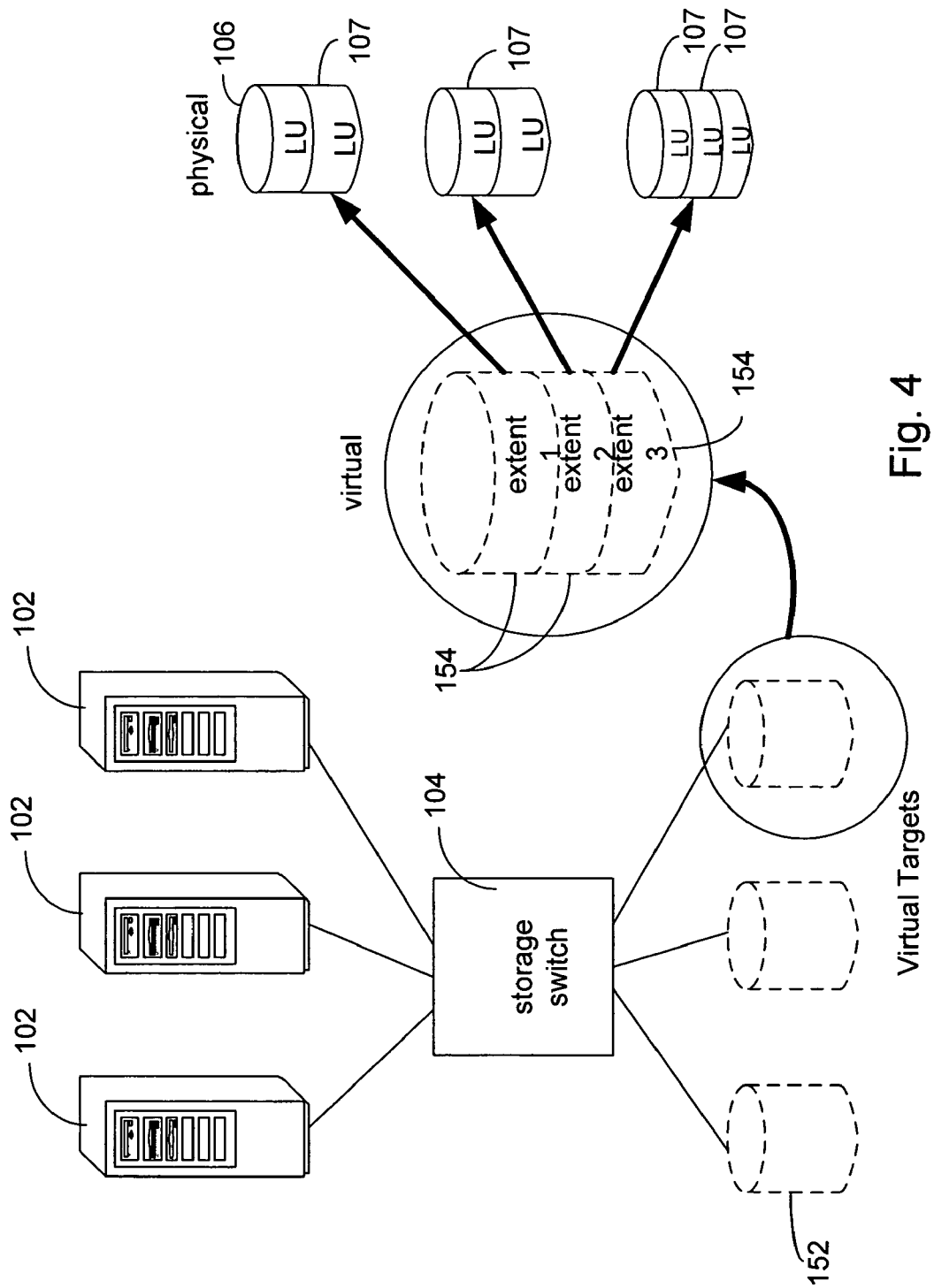
FIG. 4 is a generalized functional block diagram illustrating virtual targets as can be seen by an initiating device.

Once the LUs for physical devices are in an accessible pool (i.e., not the "No Pool"), then a virtual target or VLU can be created from those LUs. Once created, as shown in FIG. 4, the servers (and their respective users) will "see" one or more virtual targets or VLUs 152, each comprised of one or more extents 154, but they will not necessarily "see" the physical devices 106. An extent is a contiguous part of or a whole LU from a physical device. As shown in the example of FIG. 4, each extent in the example virtual target 152 is formed from entire LUs from several physical devices. "Extent" may still be referenced by an LUN from an initiator, such as a server, which doesn't realize a target is "virtual." The composition of the virtual targets, including protocols used by the LU is irrelevant to the server. However, as shown in FIG. 4, each virtual target is comprised of extents that map to the LUs of physical devices 106.

To provision a virtual target, a user selects several characteristics for the virtual target in one embodiment including:
the size (e.g., in Gigabytes);
a storage pool, although in one embodiment the user may select only from the storage pools which the user is permitted to access;
desired availability, e.g., always available (data is critical and must not ever go down), usually available, etc.;
the WWUI of the virtual target;
a backup pool;
user authentication data;
number of mirrored members;
locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics. Examples of user-selected characteristics for various virtual targets can be found in U.S. patent application Ser. No. 10/051,396, entitled VIRTUALIZATION IN A STORAGE SYSTEM, filed Jan. 18, 2002

Provisioning an Initiator Connection

When a server or other initiator is connected to a switch and the initiator supports iSNS or SLP, in one embodiment the initiator will register itself with the switch, resulting in an initiator object stored in the SCC database. In other embodiments, however, the switch will include an access provisioning function which creates, updates, or deletes an initiator connection.

In creating the access connection—the connection between the switch and an initiator (such as a server)—a user will specify various parameters such as, for example, the server WWUI, connection detail, such as protocol (e.g., GigE or Fiber Channel), exclusive or shared, source and destination IP addresses, minimum and maximum percentage of bandwidth, # of connections required by the server, access security, read only or read/write, and VPN enabled, etc.

Some or all of the user specified information is saved in an initiator object stored in the SCC database. When the connection is removed, the initiator object will be deleted.

The switch, the management station, or other network management then creates a storage pool for the particular connection, specifying the LUs available to the initiator to form virtual targets.

User Domains

Like physical devices, virtual targets can be assigned to a pool accessible only to those with specified characteristics. Thus, like physical devices, virtual targets can be assigned to a user-specific domain (sometimes referred to herein as the User's Domain), a default domain (accessible to anyone), or a No Domain. Each domain will be identified, in one embodiment, by an object in the SCC database that includes a listing of all the virtual targets assigned to the domain. For virtual targets, the No Domain may include spare virtual targets, members of mirrored virtual targets, or remote virtual targets from another switch. Essentially, the virtual target No Domain is a parking place for certain types of virtual targets. For ease of description, when referring to virtual targets, pools will be referred to herein as "domains," but when referencing physical devices, pools will continue to be referred to as "pools." It is to be understood, however, that conceptually "pools" and "domains" are essentially the same thing.

Once an initiator connection is provisioned, as described above, a virtual target is provisioned that meets the initiator's requirements and placed into an accessible pool for the initiator or a previously provisioned virtual target is made accessible to the initiator, e.g., by moving the virtual target to the initiator's user domain from another domain such as the No Domain or Default Domain. (Note that either the virtual target or the initiator connection can be provisioned first—there is no requirement that they be provisioned in a particular order). Then, once an initiator requests access to the virtual target, e.g., by sending a read or write request, both the virtual target object and initiator object are read from the SCC database and information regarding the initiator connection and virtual target is passed to the relevant linecard(s) for use in processing the requests.

Figure 5B:
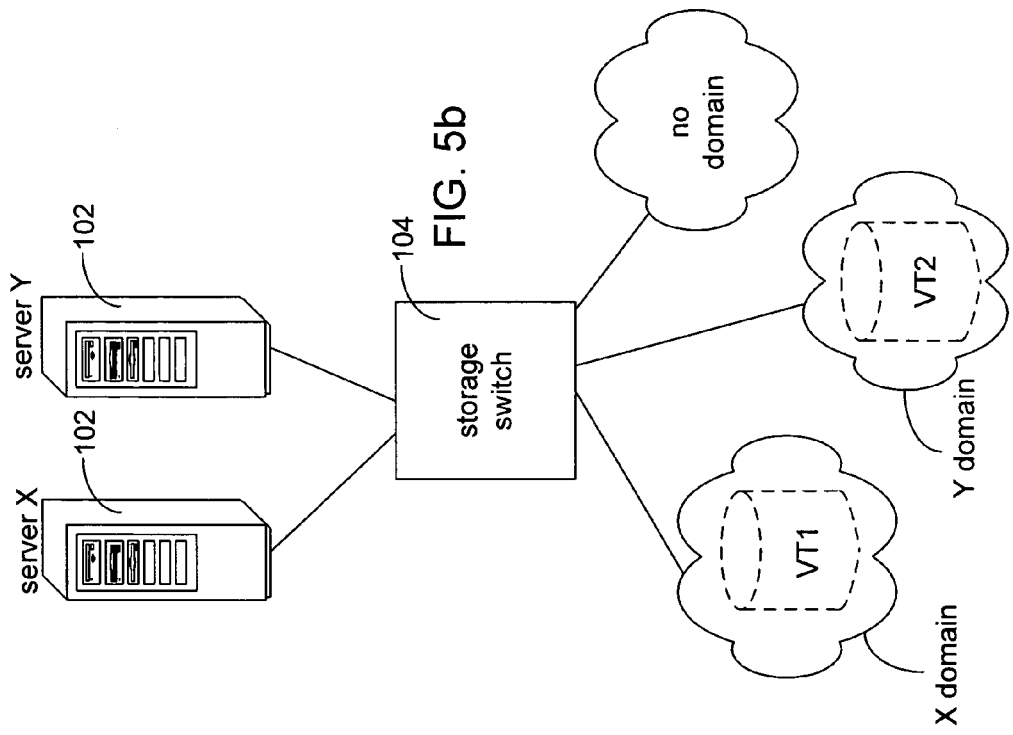
FIGS. 5a-5c are generalized functional block diagrams of a storage area network illustrating an exemplary provisioning of virtual targets.
Figure 5A:
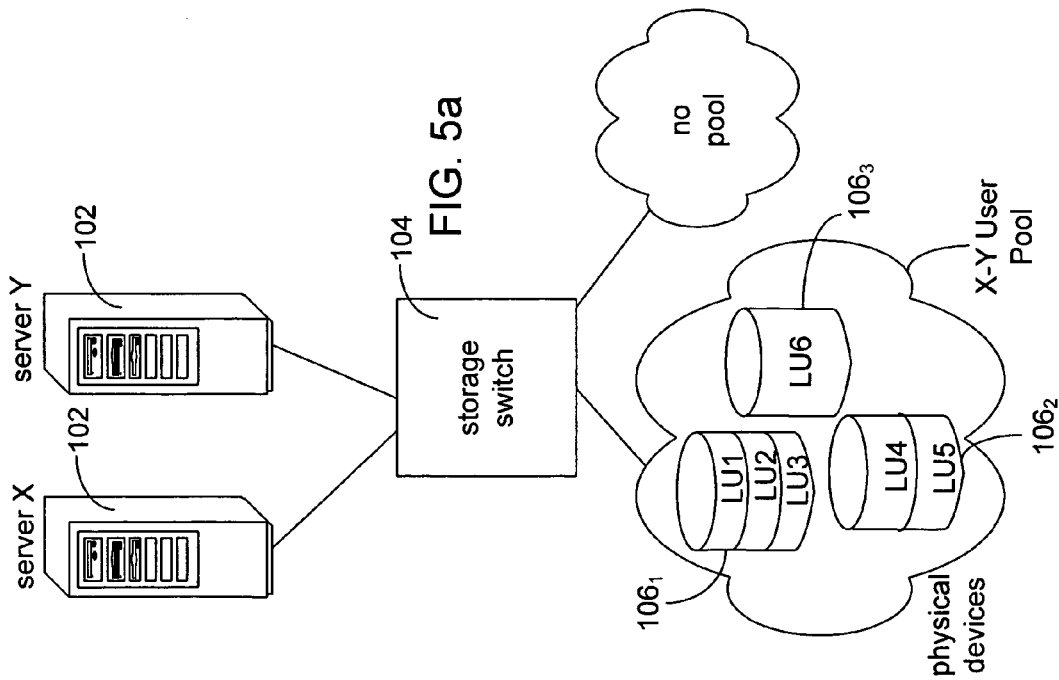
Figure 5C:
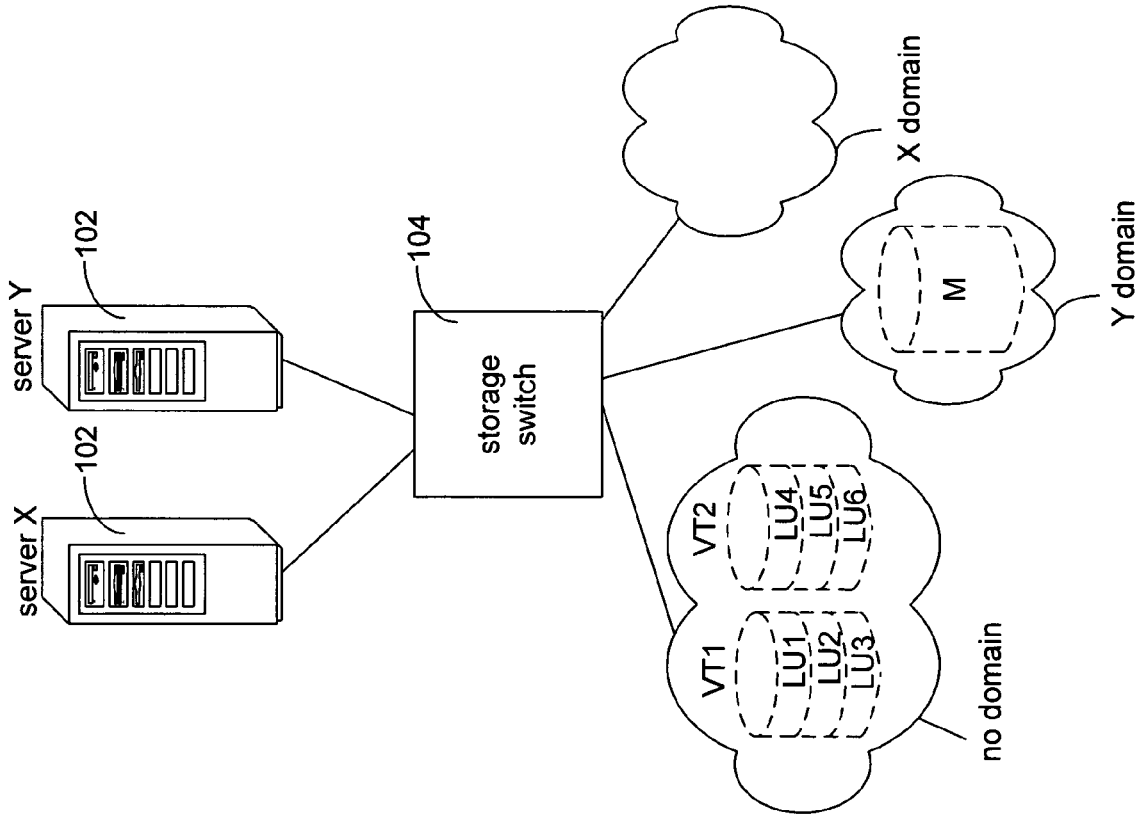

FIGS. 5a-5c illustrate one example of provisioning virtual targets in a storage area network. The system of FIGS. 5a-5c includes three physical devices $106_1$, $106_2$, and $106_3$, having a total of 6 LUs—LU1, LU2, LU3, LU4, LU5, LU6. In FIG. 5a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but no VT2, while initiator Y will have access to VT2 but not VT 1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of a LUs 1-3 (physical device $106_1$), while VT2 is comprised of LUs 4-6 (physical devices $106_2$ and $106_3$). When a request is received to write data to the virtual target M, switch 104 will route the incoming data to both VT1 (physical device $106_1$) and VT2 (physical device $106_2$ and/or $106_3$), thus storing the data in at least two physical locations.

Objects

As discussed above, each virtual target, each initiator connection, and each physical device is identified in the SCC database with information included in an object for the respective entity. Each virtual target object and physical target object will include a listing of extents or LUs that comprise it. An example of a Virtual Target object, in one embodiment of the invention, includes the following information:

entity type
    entity identifier
    managing IP address
    time stamp and flags
    ports
    domain information
    SCN bit map
    capacity and inquiry information
    number of extents
    list of extents
    extent locator
    virtual mode pages
    quality of service policy (e.g., the first three entries of Table 4)
    statistics—usage, error, and performance data
    SLA identifier A physical target (or LU) object may include similar information. More information regarding VTD information can be found in U.S. patent application Ser. No. 10/051,396, entitled VIRTUALIZATION IN A STORAGE SYSTEM, filed Jan. 18, 2002.

Classification for Storage Switch

As packets or frames (generically referred to herein as "packets") arrive at the storage switch they are separated at each port into data and control traffic. Data traffic is routed to the PPU for wire-speed virtualization and translation, while control traffic such as connection requests or storage management requests are routed to the CPU. This separation is referred to herein as "packet classification" or just "classification" and is generally initiated in the PACE of the SPU. Accordingly, unlike the existing art, which forwards all packets to the CPU for processing, a system in accordance with the invention recognizes the packet contents, so that data traffic can be processed separately and faster, aiding in enabling wire-speed processing. GigE packets and FC frames are handled slightly differently, as described below.

Figure 6A:
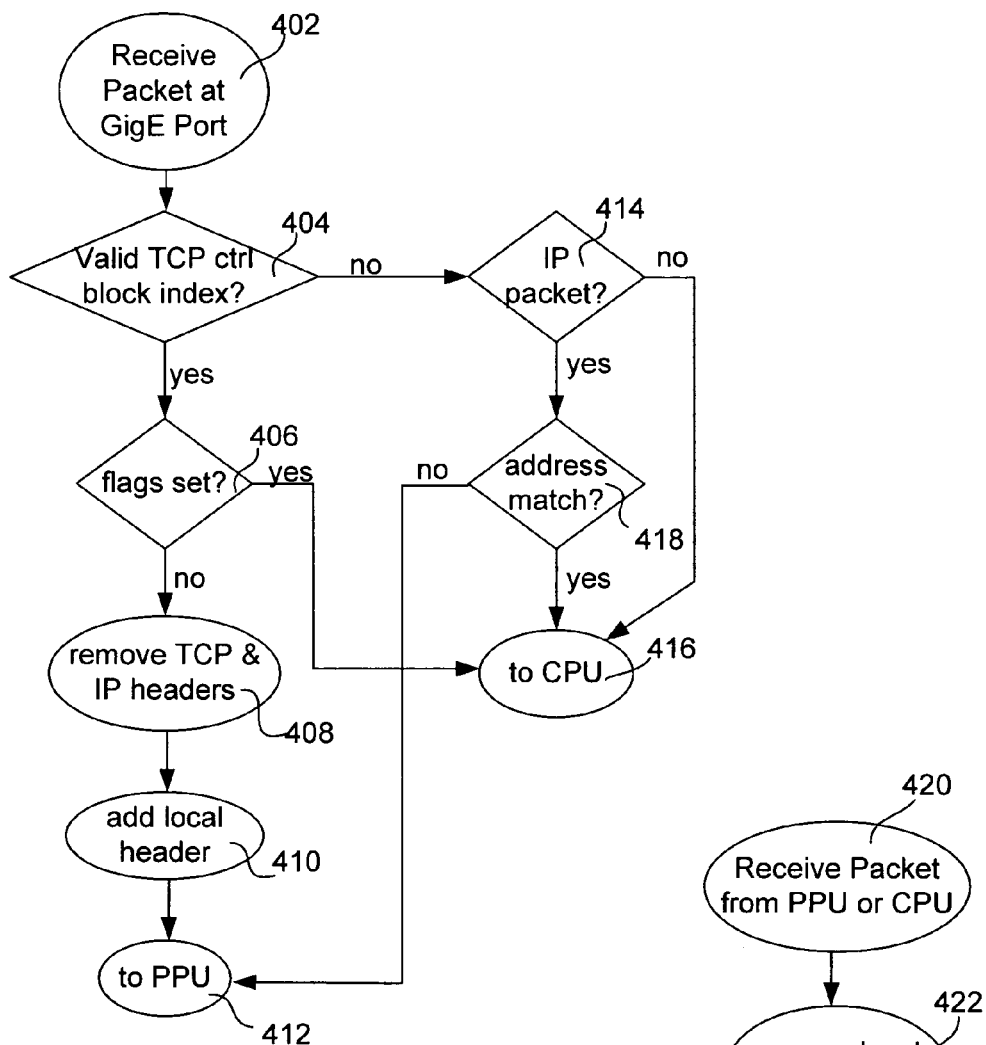
FIG. 6a is a flowchart depicting a classification process of iSCSI packets in the ingress direction as the process occurs in a PACE in accordance with one embodiment.

For packets arriving at a GigE port in the ingress direction (packets arriving at the switch), the following steps will be described with reference to FIG. 6a. A GigE port will receive a packet, which in one embodiment is either an IP packet or an iSCSI packet, step 402. Once the packet is received, the PACE determines if a virtual target access is recognized by whether it receives from the port a valid TCP Control Block Index with the packet (e.g., an index that is not −1), step 404. If there is a valid TCP Control Block Index, the PACE next checks the flags of the packet's TCP header, step 406. If the SYN, FIN, and RST flags of the TCP header are set, the packet is forwarded to the CPU, step 416, as the CPU would be responsible to establish and terminate a TCP session. Once an iSCSI TCP session is established, for managing the TCP session, the GigE port will receive a valid TCP control block from the CPU. But if the flags are not set, then in one embodiment the PACE will remove the TCP, IP, and MAC headers, step 408, leaving the iSCSI header, and then add a local header, step 410. Other embodiments, however, may leave the TCP, IP and MAC headers, and simply add a local header. Once the local header is added, the packet is sent to the PPU, step 412.

A local header can include a VTD ID to identify a VTD for a particular connection, a Flow ID to specify the destination port for a packet, a TCP Control Block Index to specify a TCP control block for a particular connection (if a TCP connection), a Type field to specify the packet classification (e.g., data or control), a Size field to indicate packet size, Task Index to track and direct the packet within the switch as well as to locate stored information related to the packet for the particular task, as well as some hardware identifiers such as source identifiers (e.g., identifying a source port, PACE, linecard, and/or CPU) and destination identifiers (e.g., identifying a distinction Port, PACE linecard, and/or CPU). The local header is used by various devices (e.g., PACE, PPU) throughout the switch. Accordingly, in some instances not all fields of the local header will be fully populated and in some instances the field contents may be changed or updated. An example of a local packet and conversion of a TCP packet can be found in co-pending U.S. patent application Ser. No. 10/051,321.

In the event that there is no valid TCP Control Block Index, step 604, then it is determined if the packet is an IP packet, step 414. If the packet is not an IP packet, it is forwarded to the CPU, step 416. If the packet is an IP packet, then the PACE checks the destination IP address, step 418. If the IP address matches that of the port of the storage switch, the packet is sent to the CPU, step 416, for processing. If the IP address does not match that of the port of the storage switch, then it is routing traffic and is forwarded to the PPU, step 412.

Figure 6B:
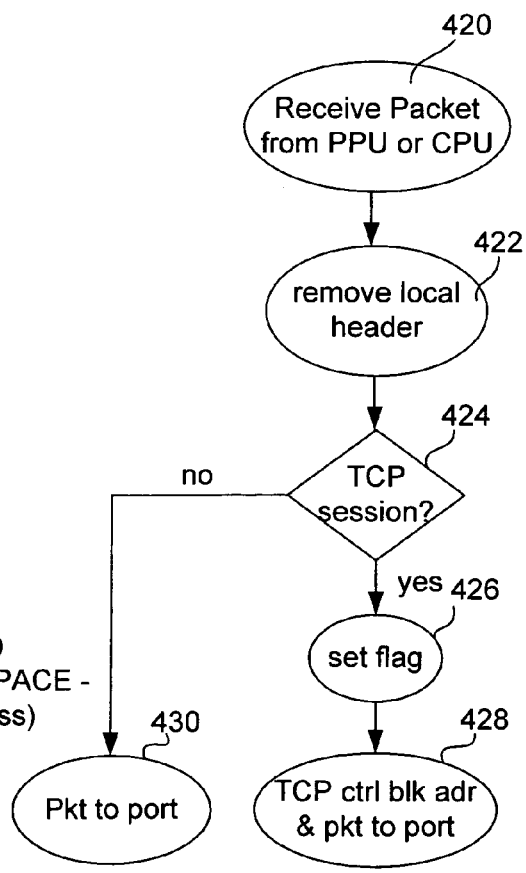
FIG. 6b is a flowchart depicting a classification process of iSCSI packets in the egress direction as the process occurs in a PACE in accordance with one embodiment.

Referring to FIG. 6b, when a packet destined for a GigE port is received in the egress direction by the PACE from an PPU or CPU, step 420, the PACE removes the local header, step 422. If the packet is for a TCP session, step 424, the PACE sets a control flag in its interface with the port to so inform the GigE port, step 426. If the packet is for a TCP session, the PACE passes the packet and the TCP Control Block Index to the port using interface control signals, step 428. If there is no TCP session, the packet is simply passed to the port, step 4300.

Figure 7A:
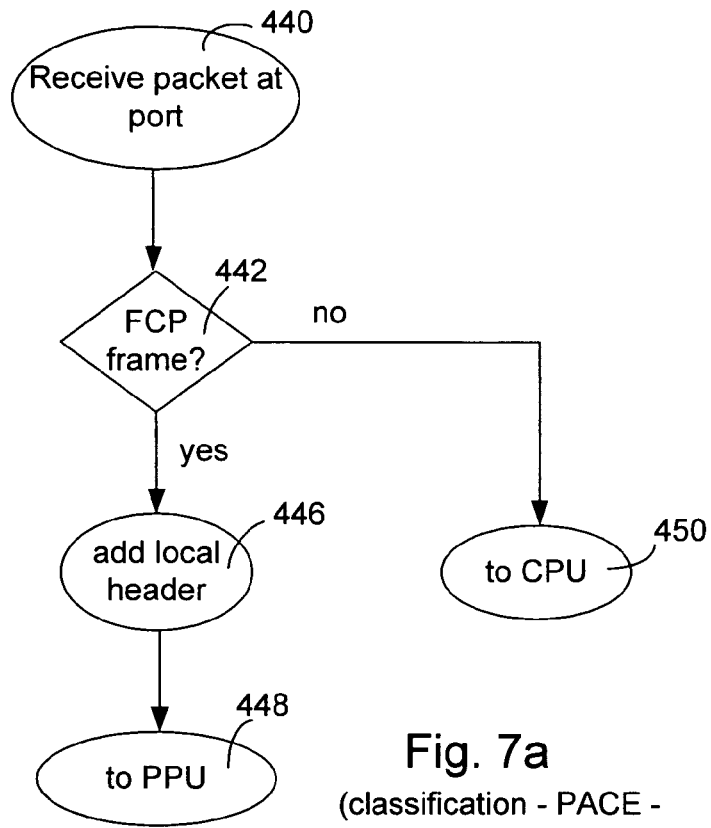
FIG. 7a is a flowchart depicting a classification process of FCP frames in the ingress direction as the process occurs in a PACE in accordance with one embodiment.

FIG. 7a illustrates the steps that occur at the PACE in classifying packets that arrive from an FC port. Unlike for a GigE port, the PACE for an FC port does not have to deal with a TCP Control Block Index. Instead, upon receiving a packet at an FC port, step 440, the S_ID field of the FCP frame header can be consulted to determine if the frame belongs to an open FC connection, however, this step is performed after the packet is passed to the PPU. Thus, the PACE only need determine if the frame is an FCP frame, step 442, which can be determined by consulting the R_CTL and TYPE fields of the frame header. A local header 4 is added, step 444, although the FCP frame header is not removed at this point as the data in the header will be useful to the PPU later. The local packet is then passed to the PPU, step 448. If the frame is not an FCP frame, it is passed to the CPU, step 450.

Figure 7B:
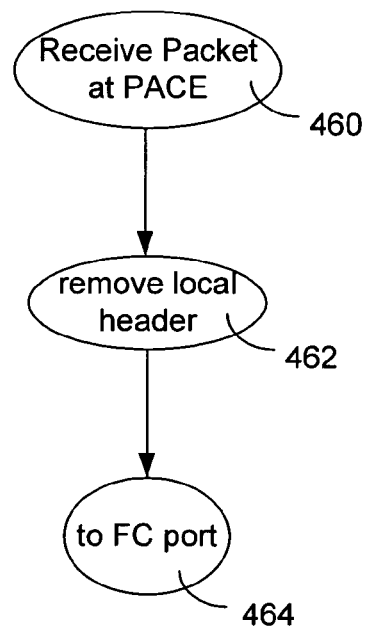
FIG. 7b is a flowchart depicting a classification process of FCP frames in the egress direction as the process occurs in a PACE in accordance with one embodiment.

Referring to FIG. 7b, when a packet destined for an FC port is received in the egress direction by the PACE from an PPU or CPU, step 460, the PACE simply removes the local header, step 462, before passing the frame to the FC port, step 464. The local header will indicate to the PACE which port (of the two ports the PACE is connected to) the packet is destined for.

Figure 8A:
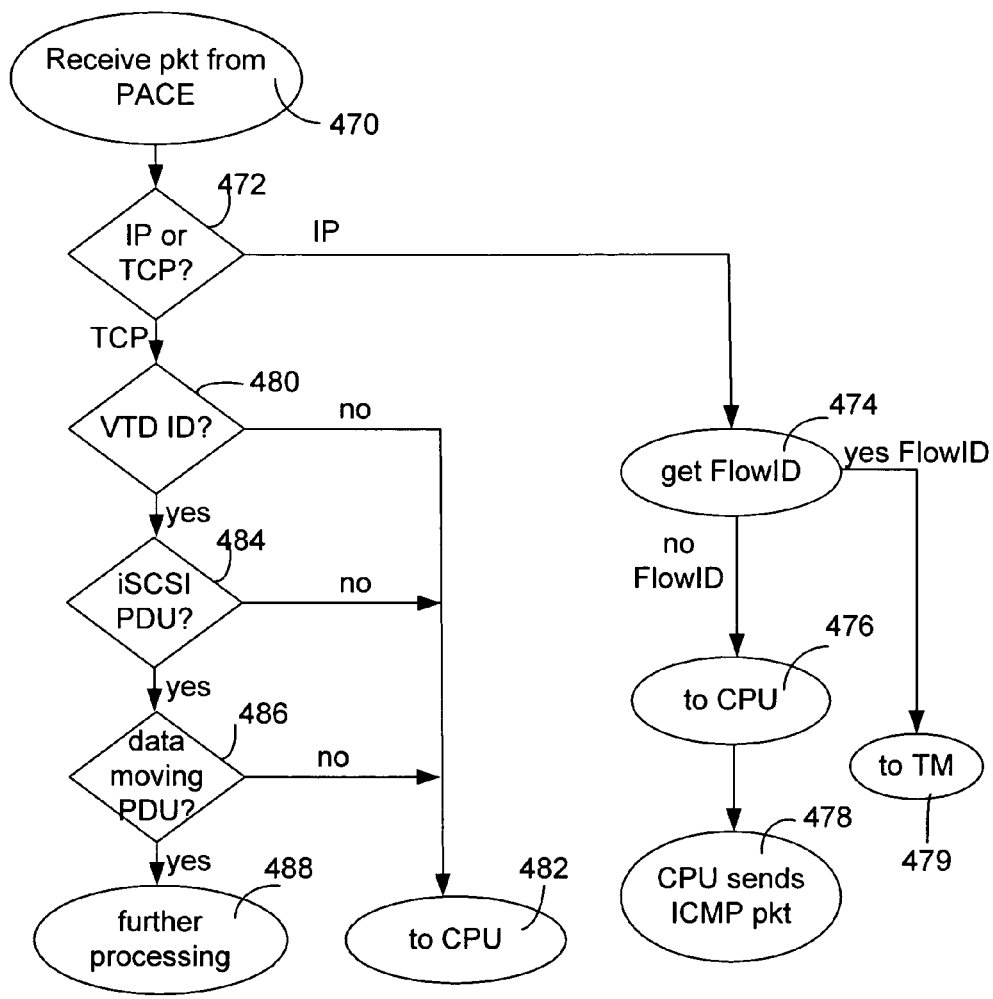
FIG. 8a is a flowchart depicting a classification process in the ingress direction as the process occurs in a PPU in accordance with one embodiment.

For packets received at either a GigE or FC port and that are passed to the PPU, the PPU further separates control traffic in one embodiment. Referring to FIG. 8a, when the PPU receives a packet from the PACE, step 470, the PPU determines if it is an IP or TCP packet, step 472. If the packet is an IP packet, the PPU searches its CAM to obtain the Flow ID of the packet from its route table, step 474. If the search fails, the packet has an unknown destination IP address, and it is passed to the CPU, step 476, which in turn sends an ICMP packet back to the source IP address step 478. If the search returns a Flow ID, then the packet is forwarded to the Traffic Manager, step 479.

When the packet received is a TCP packet, step 472, the PPU searches its CAM using the TCP Control Block Index, which identifies the TCP session, together with the LUN from the iSCSI header, which identifies the virtual target, to get a virtual target descriptor ID (VTD ID), step 480. The VTD IDs are essentially addresses or pointers to the VTDs stored in the PPU SRAM. The PPU uses the VTD ID to obtain the address of the VTD, step 480, so a search of VTD IDs allows the ability to quickly locate a VTD. If the VTD cannot be obtained, then the iSCSI session has not yet been established, and the packet is sent to the CPU, step 482. But if the VTD ID is obtained in step 480, the PPU determines if the packet contains an iSCSI PDU, step 484. If the packet does not contain an iSCSI PDU, it is forwarded to the CPU, step 482. But if it does include an iSCSI PDU, the PPU determines if the PDU is a data moving PDU (e.g., read or write command, R2T, write data, read data, response), step 486. If the PDU is not a data moving PDU, then the packet is passed to the CPU, step 482. But if the PDU is a data moving PDU, then the PPU performs further processing on the packet, step 488, e.g., virtualization and translation, as will be described later.

When the PPU receives an FCP frame with an FCP command IU in the ingress direction, the PPU performs similar steps to those described in FIG. 8a, steps 470, 480-488, except that the CAM search in step 480 uses the S_ID address and the LUN from the FCP frame to find the VTD ID.

Figure 8B:
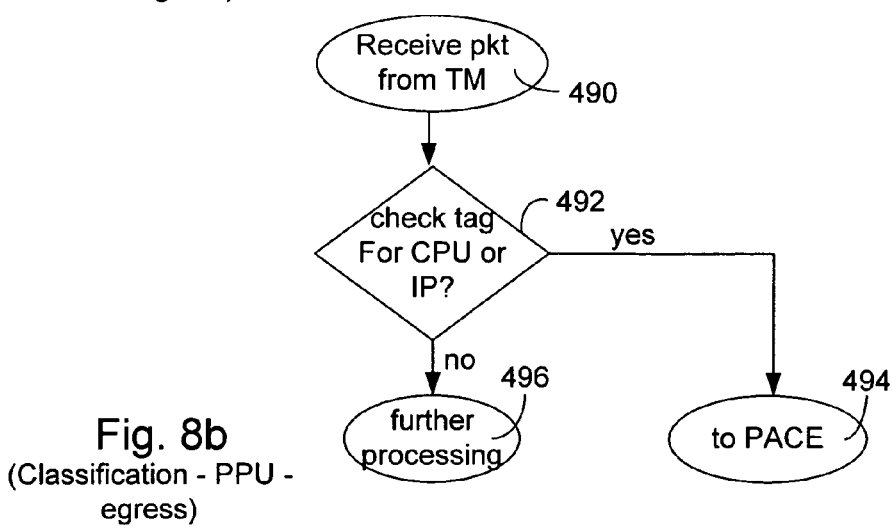
FIG. 8b is a flowchart depicting a classification process in the egress direction as the process occurs in a PPU in accordance with one embodiment.

In the egress direction, shown in FIG. 8b, after receiving a packet from the traffic manager, step 490, the PPU checks the Type field of the local header, step 492. If the field indicates that the packet is an IP packet or a packet destined for the CPU, then the PPU sends the packet to the PACE, step 494. Otherwise, the PPU performs further processing on the packet, step 496, e.g., virtualization and translation, as will be described later.

As described above, the CPU will be passed packets from the SPU in several situations. These situations include:

1. A non-TCP packet having the storage switch as its destination. Such a packet could be an ICMP, IP, RIP, BGP, or ARP packet, as are understood in the art. The CPU performs the inter-switch communication and IP routing function. The packet may also be SLP or iSNS requests that will be forwarded to the SCC.
2. An IP packet without a CAM match to a proper routing destination. While this situation will not frequently occur, if it does, the CPU returns an ICMP packet to the source IP address.
3. A non-iSCSI TCP packet. Such a packet would generally be for the CPU to establish or terminate a TCP session for iSCSI and will typically be packets with SYN, FIN, or RST flags set.
4. A non-FCP FC frame. Such frames are FLOGI, PLOGI, and other FCP requests for name services. Similar to iSCSI TCP session, these frames allow the CPU to recognize and to communicate with the FC devices. In one embodiment, the CPU needs to communicate with the SCC to complete the services.
5. An iSCSI PDU that is not a SCSI command, response, or data. Such a packet may be a ping, login, logout, or task management. Additional iSCSI communication is generally required before a full session is established. The CPU will need information from the SCC database to complete the login.
6. An iSCSI command PDU with a SCSI command that is not Read/Write/Verify. These commands are iSCSI control commands to be processed by the CPU where the virtual target behavior is implemented.
7. An FCP frame with a SCSI command that is not Read/Write/Verify. These commands are FCP control commands to be processed by the CPU where the virtual target behavior is implemented.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 9A:
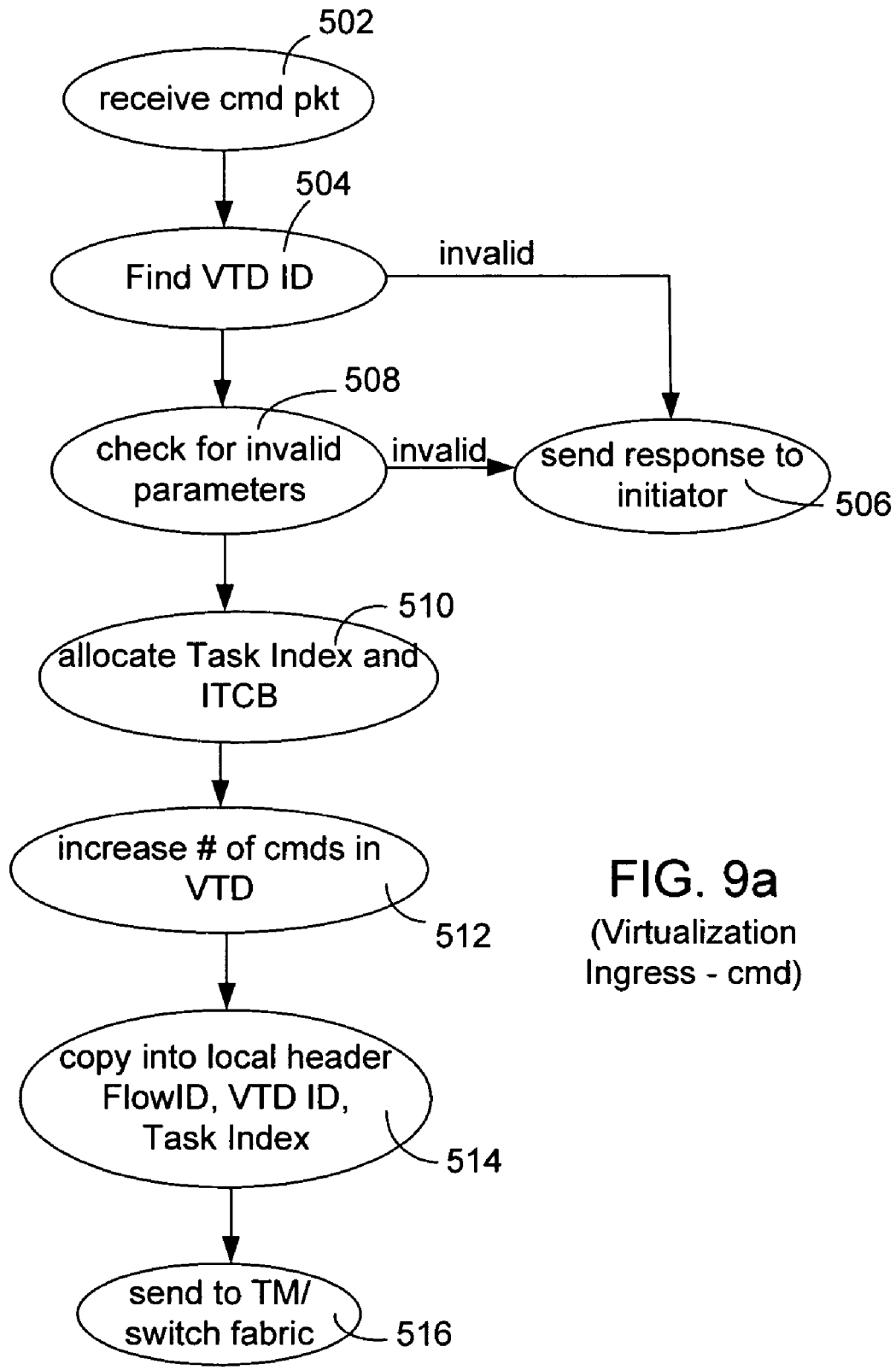
FIG. 9a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 9a, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exist, a response packet is sent back to the iSCSI or FC initiator, step 506.

A Task Index is allocated along with an Ingress Task Control Block (ITCB), step 510. The Task Index points to or identifies the ITCB. The ITCB stores the Flow ID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512. In some embodiments, VTDs establish a maximum number of commands that may be outstanding to any one particular virtual target. The Flow ID, the VTD ID, and the Task Index are all copied into the local header, step 514. The Flow ID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 516.

When a virtual target is composed of multiple extents, there are multiple Flow IDs identified in the VTD, one for each extent. The PPU checks the block address for the packet and selects the correct Flow ID. For example, if a virtual target has two 1 Gb extents, and the block address for the command is in the second extent, then the PPU selects the Flow ID for the second extent. In other words, the Flow ID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 9B:
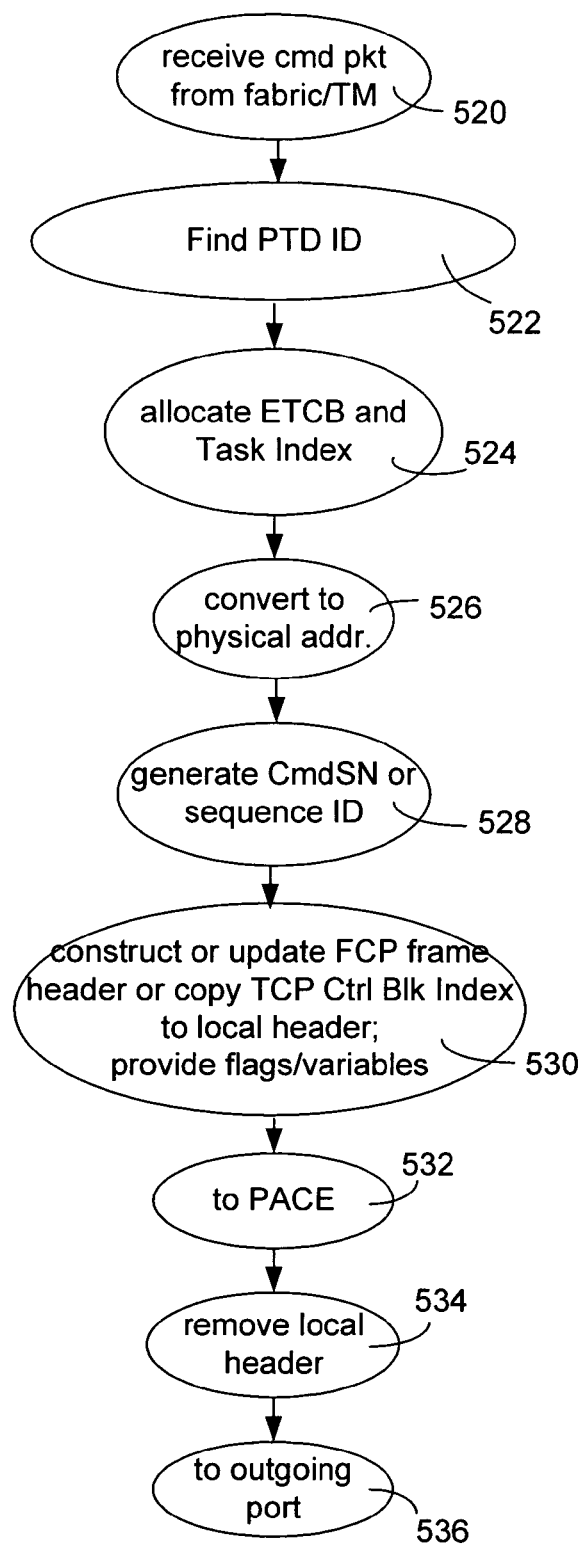
FIG. 9b is a flowchart illustrating a virtualization process in the egress direction for command packets or frames, in accordance with one embodiment.

Referring to FIG. 9b, after a command PDU or IU has passed through the switch fabric, it will arrive at an PPU, destined for an egress port, step 520. The PPU attempts to identify the physical device(s) that the packet is destined for, step 522. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the Flow ID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 524. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device, step 526. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 528 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 530. In addition, the PPU provides any flags or other variables needed for the iSCSI or FCP headers. The completed iSCSI PDU or FCP frame are then sent to the PACE, step 532, which in turn strips the local header, step 534, and passes the packet to appropriate port, step 536.

R2T or XFER RDY—Ingress

Figure 10A:
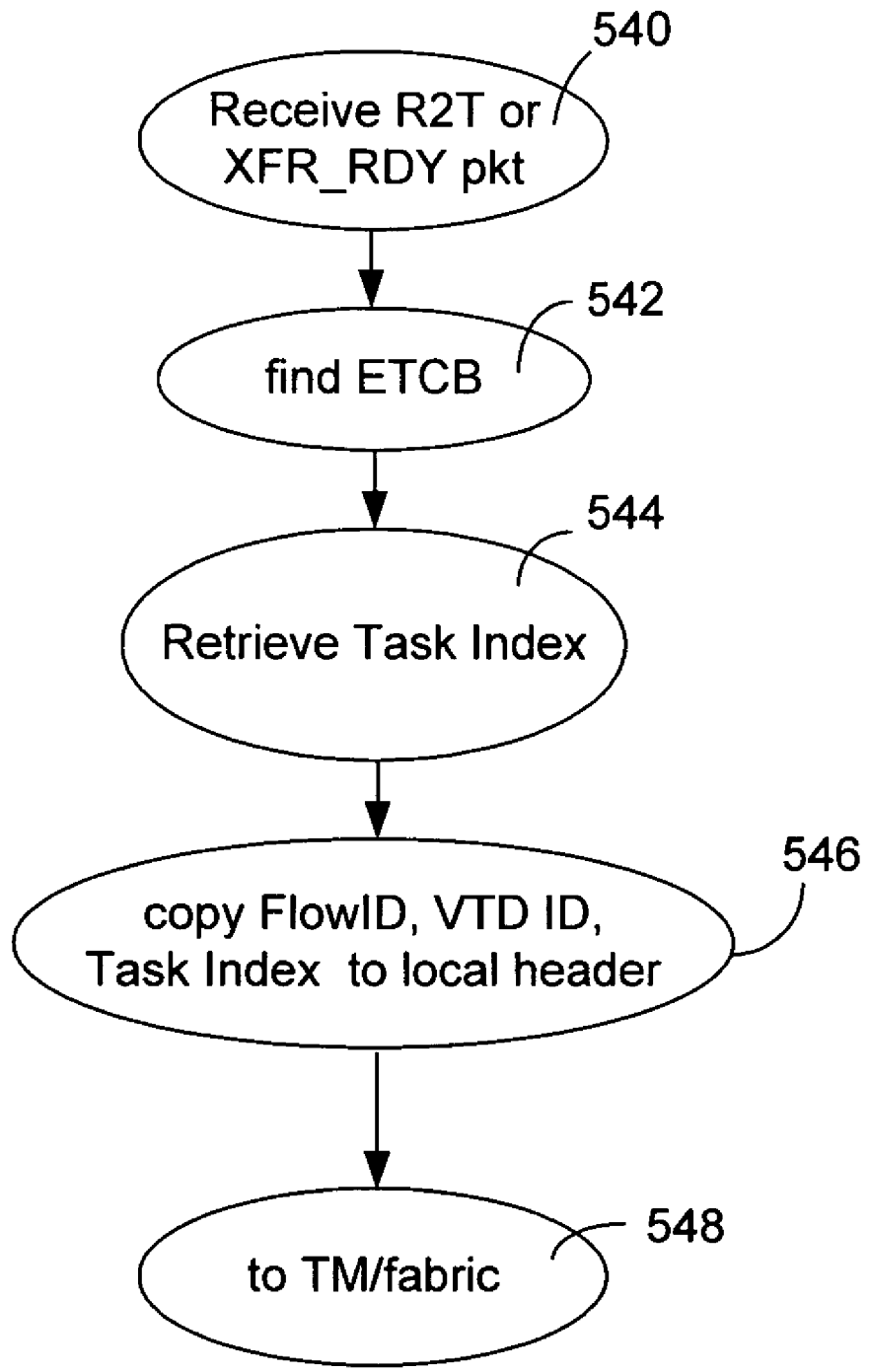
FIG. 10a is a flowchart illustrating a virtualization process in the ingress direction for R2T or XFER_RDY packets or frames, in accordance with one embodiment.

Referring to FIG. 10a, after a command has been sent to a target storage device as described above, and the command is a write command, an R2T PDU or an XFER_RDY IU will be received from a storage device when it is ready to accept write data, step 540. The PPU identifies the corresponding ETCB, step 542, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 544. The PPU also retrieves the Flow ID from the PTD, which is also identified in the ETCB by the PTD ID. The Flow ID indicates to the traffic manager the linecard of the original initiator (ingress) port. The Flow ID, the VTD ID, and the Task Index are copied into the local header of the packet, step 546. Finally the packet is sent to the traffic manager and the switch fabric, step 548.

R2T or XFER RDY—Egress

Figure 10B:
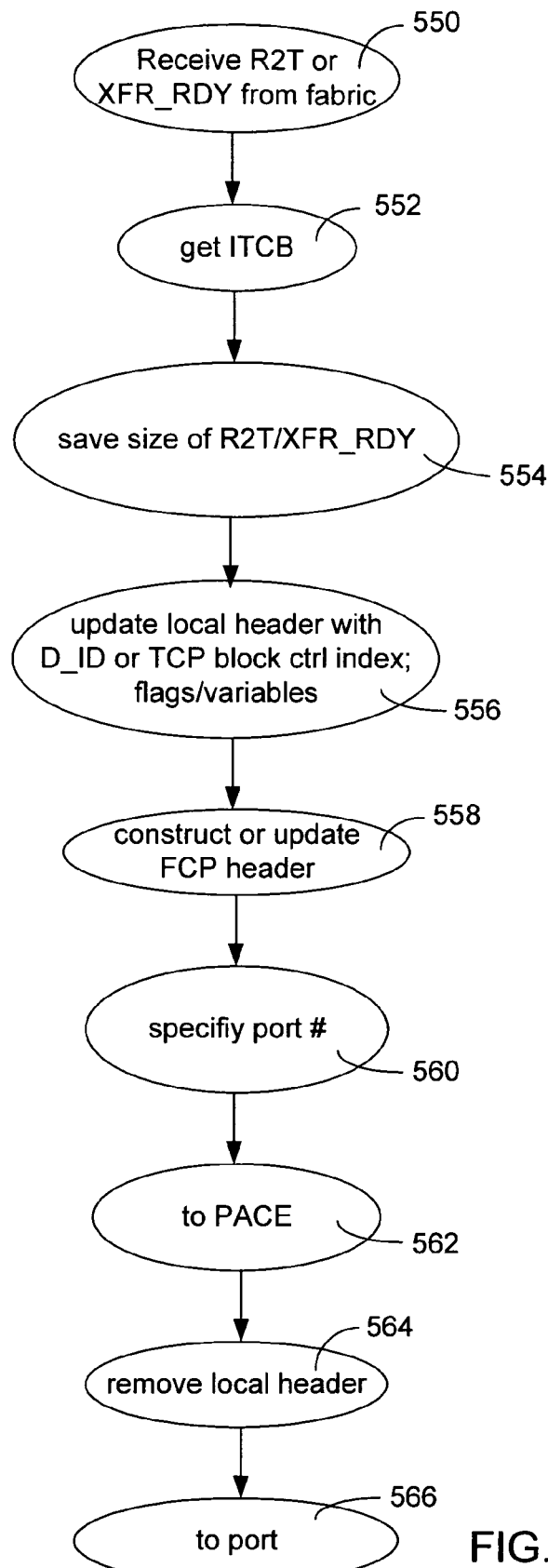
FIG. 10b is a flowchart illustrating a virtualization process in the egress direction for R2T or XFER_RDY packets or frames, in accordance with one embodiment.

Referring to FIG. 10b, after the R2T or XFER_RDY packet emerges from the switch fabric, it is received by a PPU, step 550, on its way to be passed back to the initiator (the device that initiated the original command for the particular task). The Task Index identifies the ITCB to the PPU, step 552, from which ITCB the original initiator_task_tag and the VTD ID can be obtained. The R2T/XFER_RDY Desired Data Transfer Length or BURST_LEN field is stored in the ITCB, step 554. The local header is updated with the FCP D_ID or the TCP Control Block Index for the TCP connection, step 556. Note that the stored S_ID from the original packet, which is stored in the ITCB, becomes the D_ID. If necessary, an FCP frame header is constructed or its fields are updated, step 558. The destination port number is specified in the local header in place of the Flow ID, step 560, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 562, which identifies the outgoing port from the local header. The local header is then stripped, step 564 and forwarded to the proper port for transmission, step 566.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 11A:
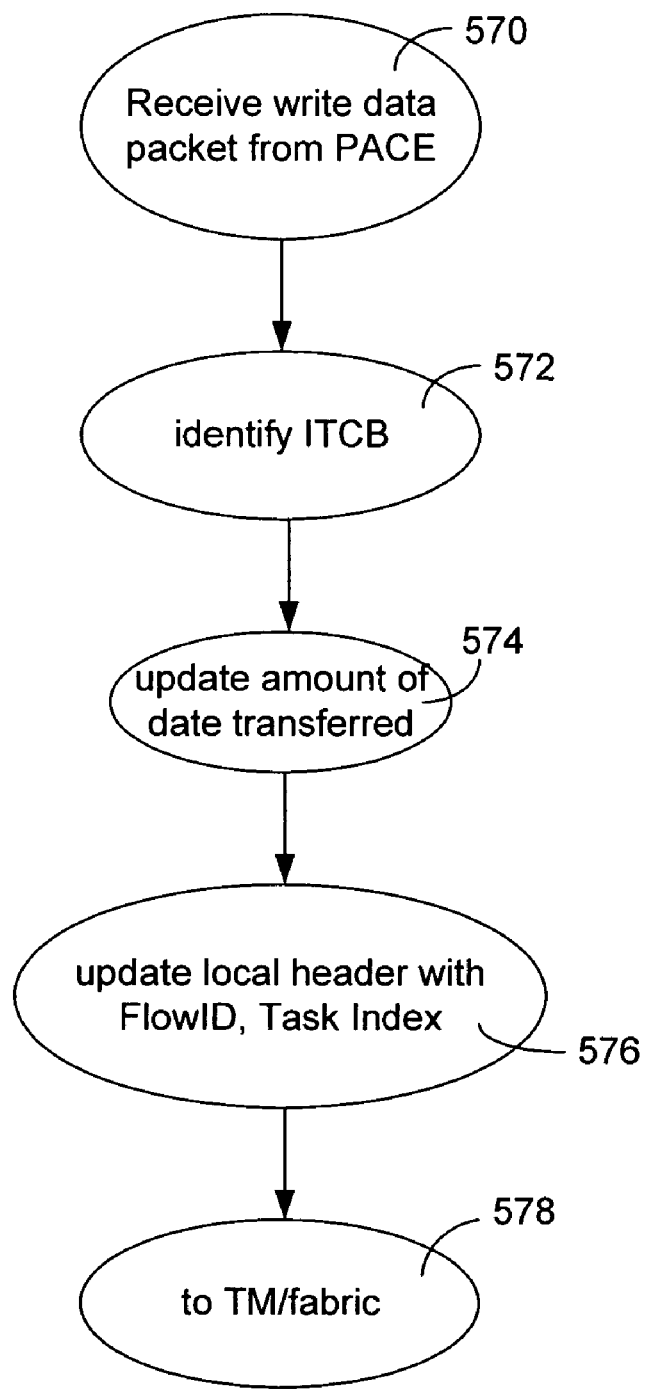
FIG. 11a is a flowchart illustrating a virtualization process in the ingress direction for write data packets or frames, in accordance with one embodiment.

After an initiator receives an R2T or XFER_RDY packet it returns a write-data packet. Referring to FIG. 11a, when a write-data iSCSI PDU or FC IU is received from an initiator, step 570, the ITCB to which the packet belongs must be identified, step 572. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 574. The Flow ID and Task Index are added to the local header of the packet, step 576. The packet is then forwarded to the traffic manager and ultimately to the switch fabric, step 578.

Write Data Packet—Egress

Figure 11B:
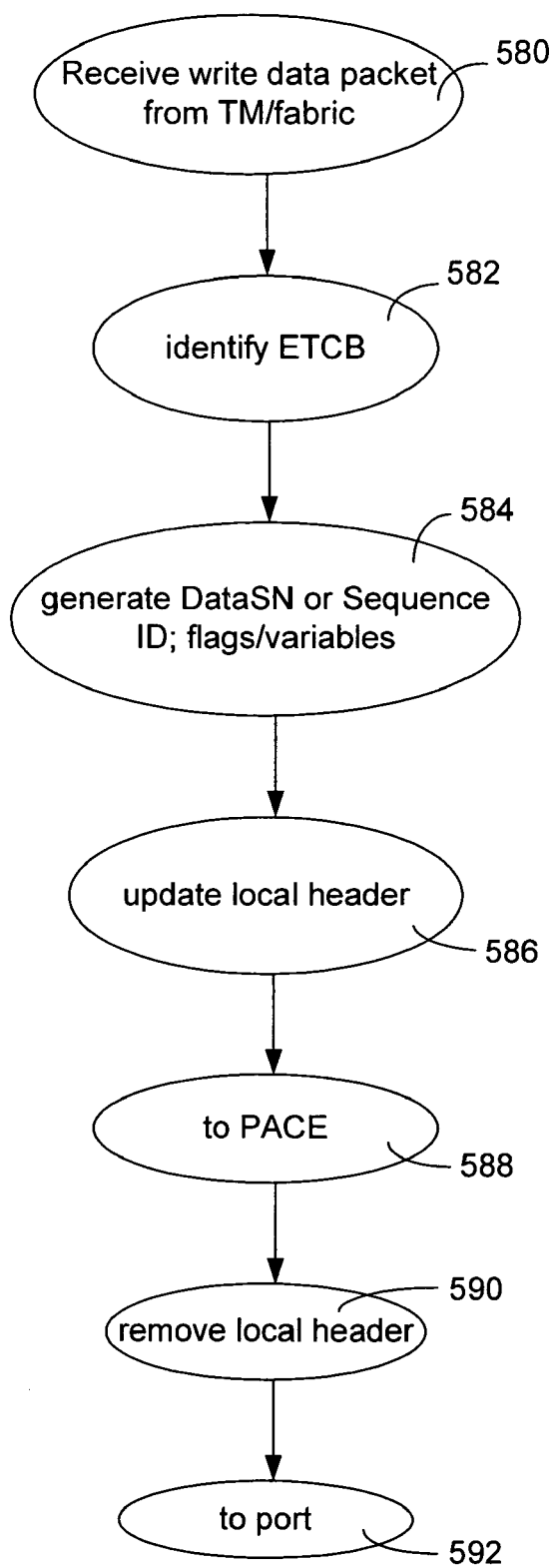
FIG. 11b is a flowchart illustrating a virtualization process in the egress direction for write data packets or frames, in accordance with one embodiment.

Referring to FIG. 11b, when a write-data packet is received from the switch fabric (via the traffic manager), step 580, the ETCB for the packet needs to be identified, step 582. Typically, the ETCB can be identified using the Task Index in the local header. Once the ETCB is found, using the information inside the ETCB, the PPU generates proper iSCSI DataSN or FCP sequence ID, step 584, along with any other flags and variables, e.g., data offset, for the PDU or FCP frame header. The local header is updated with the TCP Control Block Index or the FCP D_ID from the PTD, step 586. The port number is also added to the local header. The finished iSCSI PDU or FCP frame is sent to the PACE, step 588, which removes the local header, step 590, and forwards the packet to the appropriate port, 592.

Mirror Synchronization and Verification

A mirrored virtual target (or mirrored VLU) maintains data in two or more physical locations for improved reliability in data storage. A mirrored virtual target or VLU includes at least two members, each representing the virtualization of different physical targets or groups of physical targets. When a mirrored virtual target is initially provisioned, the data stored in each member of the virtual target must be synchronized. Accordingly, an initial mirror synchronization operation can be performed to synchronize the data between each of the physical targets (or groups of physical targets) provisioned as a member of the mirrored virtual target. In one embodiment, the data can be synchronized by establishing one member as a primary or source member. The data can be read from the underlying physical device(s) of the primary member and written to the physical device(s) of the remaining members of the mirrored virtual target referred to as destination members. After the data of the primary member is written to each of the destination members, an initial state of the virtual target is established and the virtual target can be said to be mirrored, with each target member storing an identical set of data for the mirrored virtual target in its underlying physical target(s).

Although the present disclosure often refers to the initial mirror synchronization being performed upon initial provisioning of a mirrored virtual target, such need not be the case. Initial mirror synchronization can be performed at anytime. For example, after determining that one or more targets of a mirrored virtual target have become unsynchronized for some reason, the mirrored members of a target can be synchronized. Initial mirror synchronization can be performed at any desired moment in time to ensure the synchronization of the mirrored target's members.

Figure 12:
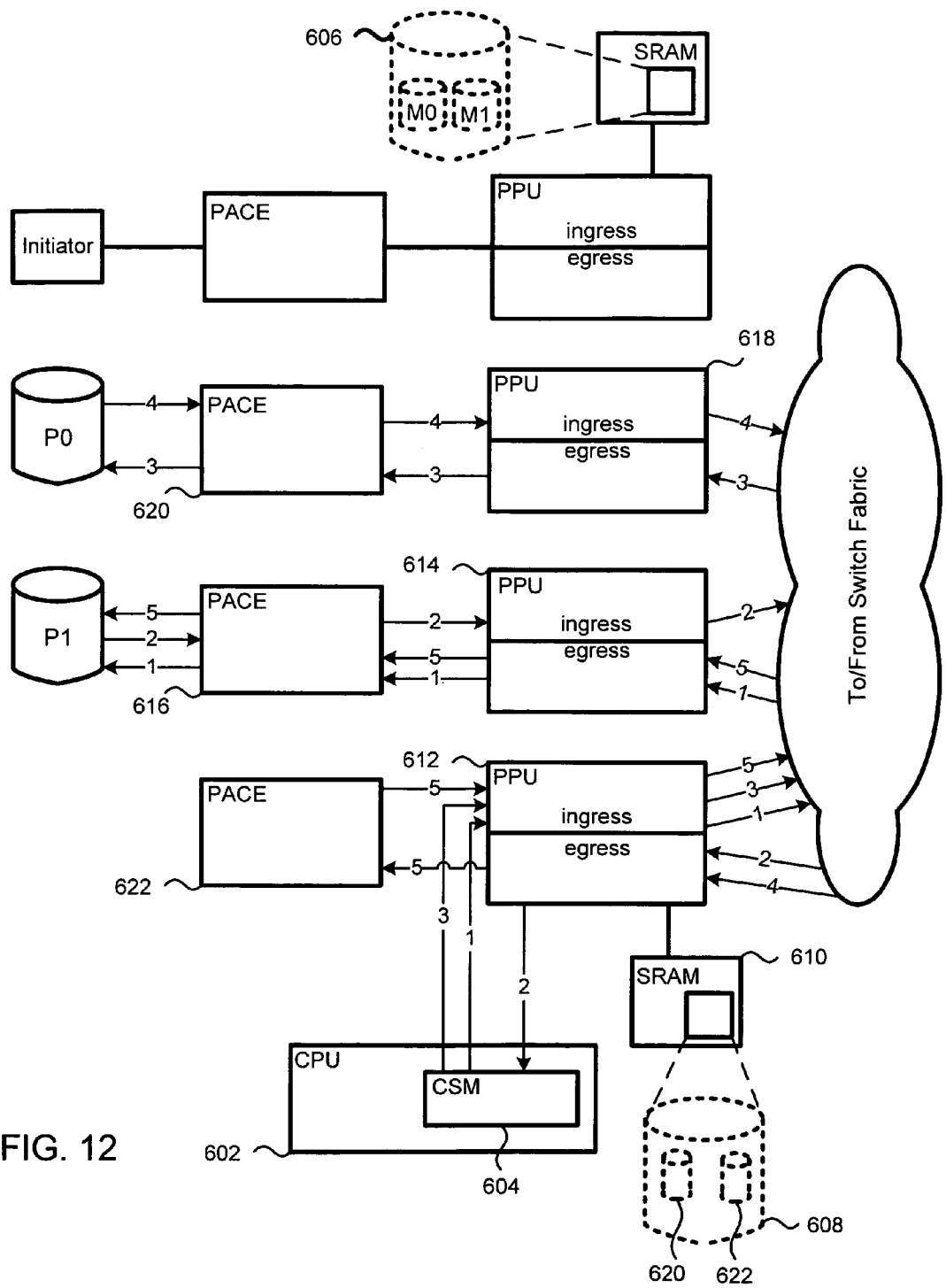
FIG. 12 is a block diagram depicting a storage area network and mirror synchronization in accordance with one embodiment.

Synchronization of a mirrored virtual target can be performed as depicted in the storage network of FIG. 12. FIG. 12 is a simplified block diagram of a SAN including various components of a storage switch. A data and command flow that can be used to synchronize the members of a mirrored virtual target is depicted by the arrows within the SAN. Many components of the storage switch have been omitted from FIG. 12 for clarity of discussion, their operation having been heretofore described. A storage switch in accordance with one embodiment as depicted in FIG. 12 can include a central processing unit 602. CPU 602 can include a copy service manager (CSM) 604 to manage the initial mirror synchronization in one embodiment. CSM 604 can include in various embodiments one or more software modules, components, or sets of instructions that can perform the functionality substantially as described herein. CSM 604 can include dedicated hardware and/or can include hardware that is programmed by software stored on one or more storage devices such as non-volatile memory (e.g. flash memory, EEPROM, etc.) or other memory devices.

A user may provision a virtual logical unit 606 including a first member M0 representing the virtualization of a first physical target P0 and a second member M1 representing the virtualization of a second physical target P1. Each physical target P0 and P1 depicted in FIG. 12 can represent one or more LUs of one or more physical devices. Mirrored VLU 606 includes two members but it will be understood by those of ordinary skill in the art the principles and disclosure presented herein can be used in accordance with any mirrored target having any number of mirrored members.

To begin the initial synchronization of the physical targets corresponding to provisioned VLU 606, an internal virtual target (IVT) can be created. For example, CSM 604 can create an IVT 608, which is stored in memory 610 and accessible to PPU 612. Memory 610 and PPU 612 could be SRAM 305, and PPU 306, as depicted in FIG. 3. IVT 608 can be provisioned to include a first internal virtual logical unit (IVLU) corresponding to a member of the mirrored target 606 designated as a source member for the operation. One or more second IVLUs can be provisioned that correspond to the remaining destination members of the mirrored target 606. In one embodiment, a user provisioning VLU 606 can designate which member of the VLU is to be the primary member. In other embodiments, the storage switch can designate one of the members by default. In FIG. 12, a source IVLU(0) 620 is provisioned for the source target M0 and a destination IVLU (1) 622 is provisioned for the destination target M1.

If a mirrored VLU includes 3 or more members separate IVLUs can be provisioned for each member or each member can be provisioned as a separate member of the same IVLU. An IVLU can be a temporary object created or provisioned for the initial mirror synchronization operation. After the synchronization operation is complete, the IVLU can be discarded. CPU 602 and CSM 604 can function as an internal initiator during synchronization to provide read and write commands to IVLU(0) 620 and IVLU(1) 622.

After provisioning IVT 608, CSM 604 issues a write command to the destination member(s). In the example of FIG. 12, member M0 is the primary member. Accordingly, the write command is first issued to the destination target P1. The command flow for the write command is designated as 1 in FIG. 12. CSM 604 issues the write command to IVLU(1) 622. If there are multiple destination members, CSM 604 can issue multiple write commands to individual IVLUs provisioned for each destination member or one or more write commands to individual members of one or more IVLUs provisioned for the destination members. The write command is received at ingress PPU 6121. PPU 612 can determine the location (e.g., linecard and port location) of P1 from a VTD object maintained for IVLU (1) 622. After determining the location of P1, the write command is forwarded through the switch fabric to PPU 614. PPU 612 can update header information for the write command to specify the appropriate destination linecard and port. If VLU 606 includes more than two mirrored members, PPU 612 determines the location of a physical target corresponding to each destination member of the mirrored VLU and forwards the write command to each of those physical targets.

The write command is first sent from the ingress of PPU 612 through the switch fabric to PPU 614. Components such as traffic managers and interfaces are omitted from FIG. 12 for clarity of discussion. From the egress PPU of 614, the write command travels from PACE 616 to physical target P1. If target P1 has an available transfer ready signal, a transfer ready signal (depicted as 2) is returned to PACE 616 where it is routed back to PPU 612 and CSM 604.

CSM 604 waits to receive a transfer ready signal from each destination target(s) before issuing a read command to the source member. By first issuing a write command to the destination target(s), a storage switch in accordance with one embodiment can establish an internal flow for the data to be synchronized prior to receiving the data. In this manner, the successful routing of data from source to destination at line speed and without buffering can be ensured. By waiting to receive a transfer ready signal from each of the destination targets before issuing the read command, the storage switch ensures that the data read from the source target is routed to each destination target without buffering. Thus, data can be read from the source target and simultaneously multicast to each destination target.

After receiving transfer ready signals from each destination target, CSM 604 issues a read command to the source member. The read command, designated as 3 in the command flow of FIG. 12, is routed from PPU 612 to PPU 618 and on to target P0.

Target P0 receives the read command and returns read data which in one embodiment, can include one or more read data packets in accordance with the smallest data size specified by a transfer ready signal (e.g., burst length or desired data length field) returned by a destination target. The read data, specified as 4 in FIG. 12, is forwarded from source target M0 to the egress of PPU 612. PPU 612 converts the read data packet(s) to write data packet(s) which can include updating local header information for the packet to indicate that it is a write data packet. In one embodiment, PPU 618 will retrieve and copy the VTD ID, Task Index, and Flow ID from the allocated ETCB into the local header when the read packet is received from the source target P0. When the read data is received at PPU 612, the ITCB allocated for the write request is referenced to update the read data header information with values corresponding to the allocated ITCB. In FCP—SCSI, for example, the Read frame header fields, including OX_ID, RX_ID, SEQ ID, SEQ_CNT, and PARAM are converted to values corresponding to the write command ITCB and data stream.

After converting the read data to write data, PPU 612 forwards the write data to the destination target(s). The write data, designated as 5 in the command flow of FIG. 12, is first routed from the egress of PPU 612 to PACE 622 and back to the ingress of PPU 612. This enables PPU 612 to forward the write data to the switch fabric where it can be routed to the PPU(s) associated with the destination target(s). For example, PPU 614 receives the write data from the switch fabric and forwards the data to destination target PI via PACE 616.

It will be appreciated by one of ordinary skill in the art that if a transfer ready signal is returned from a physical destination target that specifies a desired data length or burst field length that is less than the entire size of an issued write command, the process depicted in FIG. 12 can be repeated until all of the data for the write command is provided to the destination target(s). Additionally, multiple write commands may be issued to the destination targets in order to synchronize an entire VLU. For example, each write command may be issued for a limited transfer size such as 128K. Accordingly, the process may be repeated many times in order to synchronize one VLU.

In addition to synchronizing the members of a mirrored virtual target, a storage switch in accordance with various embodiments can verify that the members of a mirrored virtual target are in fact synchronized. To verify that the members of a mirrored virtual target are synchronized, the data of one member of a mirrored target is read and compared with that of the other members. A storage switch in accordance with one embodiment can verify that the members of a mirrored virtual target are synchronized at line speed and without buffering data read from the source member and compared with the data of the other member(s). Mirror verification is very similar to mirror synchronization except that verify commands are used in place of write commands. For more details regarding mirror verification operations as well as more details regarding synchronization and examples of provisioning IVTs at various PPUs of a storage switch, see co-pending U.S. patent application Ser. No. 10/837,248, entitled "Online Initial Mirror Synchronization and Verification in Storage Area Networks," filed Apr. 30, 2004, incorporated herein by reference in its entirety.

A storage switch in accordance with embodiments can accept incoming commands from initiating devices during initial mirror synchronization or mirror verification of a virtual target. The mirrored virtual target can remain "online" during the synchronization or verification such that failure responses including busy and task set full status signals are not returned to initiating devices trying to access the mirrored virtual target or VLU. In this manner, initiator commands can be processed concurrently while a synchronization or verification operation is proceeding without the initiator experiencing any loss of service for the mirrored target. In one embodiment, incoming commands received while synchronization or verification is proceeding can be processed without being forwarded to a central processing unit of a linecard switch for management by a copy or verify service manager performing synchronization or verification. By not forwarding incoming commands to a central processing unit, performance can be optimized by not placing the incoming commands into the command path for the central processing unit. Commands to be processed by the CPU are handled in the order in which they were received which can lead to a delay in processing write and read commands. For many applications, such delayed access to underlying physical storage is unacceptable. Accordingly, in various embodiments, incoming commands received during synchronization and verification can be handled by the packet processing units receiving the commands in order to avoid delays incurred by CPU processing.

Such implementations, however, create the potential for deadlock occurrences at the switch and physical target level. Moreover, such implementations create the potential for inconsistencies among physical targets provisioned for the mirrored virtual target. Accordingly, special measures are provided to avoid the occurrence of deadlock or mirror inconsistency while processing incoming commands for a mirrored virtual target that is being synchronized or verified.

FIGS. 13a through 13c illustrate a scenario causing deadlock when performing an online mirror synchronization operation. A storage area network is depicted that includes a storage switch 704 coupled to an initiator 702 and two physical targets 706 and 708. Physical targets 706 and 708 are provisioned as members (e.g., members M0 and M1 of FIG. 12) of a mirrored virtual target or VLU (e.g., VLU 606 of FIG. 12) within storage switch 704. Each target 706 and 708 can represent an LU of a physical device or an entire device or storage subsystem. An internal virtual target 711 has been provisioned at ingress port 710 for the performance of a mirror synchronization operation. IVT 711 can be a temporary IVT provisioned for the operation and in other examples, may be provisioned at a different ingress port than that at which the write command is received. IVT 711 can include a first IVLU corresponding to a member of the VLU being synchronized that is designated a source member. IVT 711 can include a second destination IVLU corresponding to a destination member of the VLU being synchronized. If the VLU being synchronized includes three or more members, IVT 711 can include a separate destination IVLU for each destination member or a single destination IVLU with multiple destination members.

At a first exemplary time period, t=0, initiator 702 has issued a write A command for the mirrored virtual target having mirrored members corresponding to physical targets 706 and 708. The write A command, received at ingress port 710, is multicast to the egress ports coupled to physical targets 706 and 708. Also at time t=0 a copy service manager or other internal initiator 716 has issued a write S2 command to IVT 711 at ingress port 710. The write command is sent to the destination IVLU of IVT 711 provisioned with members corresponding to target 708. Ingress port 710 has forwarded the write S2 command to egress port 714 connected to destination physical target 708. The write S2 command is associated with a mirror synchronization operation being performed by the copy service manager. Copy service manager 716 has issued the write S2 command to determine if physical target 708 is available to receive data before such data is read from physical target 706 in order to avoid buffering the data at the switch.

At time t=1, depicted in FIG. 13b, egress port 712 has issued the write A1 command to target 706 and target 706 has returned a XFER_RDYA1 signal. Also at time t=1, egress port 714 has issued the write S2 command to physical target 708 and target 708 has returned a XFER_RDYS2 signal. The XFER_RDYA1 signal has been forwarded to ingress port 710 and the XFER_RDYS2 signal has been forwarded to ingress port 710 and on to CSM 716.

In the example presented with respect to FIGS. 13a through 13c, it is assumed that physical targets 706 and 708 can only issue one transfer ready signal at a time. That is to say, each of the physical targets can only process a single request to write data at any given time. Although the present examples depict XFER_RDY signals it will be appreciated that the principles are equally applicable to other protocols such as R2T signals in the ISCSI protocol.

In unbuffered write operations to mirrored targets, storage switches determine the ability of each mirrored target to receive data prior to issuing transfer ready signals to imitating devices. By waiting to receive a transfer ready signal from each target, the switch ensures that data received from the initiating device can be multicast to each of the physical targets without being buffered within the storage switch. Similarly, when performing mirror synchronization or verification operations, internal initiators ensure that the destination targets are able to receive data from the source target prior to reading data from the source target in order to avoid buffering the data within the switch doing the transfer.

At time t=2, depicted in FIG. 13c, copy service manager 716 has issued a read S1 command to the source IVLU of IVT 711 after receiving the XFER_RDYS2 signal. Ingress port 710 has forwarded the command to egress port 712. The read command is forwarded from egress port 712 to physical target 706. Also at time t=2, egress port 714 has issued the write A2 command to physical target 708.

Because physical target 706 has issued its only transfer ready signal in response to the write A1 command, it cannot issue read data in response to the read S1 command. Target 706 may block the read command and issue no data. Similarly, because physical target 708 can only issue one transfer ready signal at a time, it cannot issue a XFER_RDYA2 signal in response to the write A2 command.

The scenario of FIGS. 13a-13c causes deadlock at both of the physical targets as well as at storage switch 704. Ingress port 710 will not receive a transfer ready signal from physical target 708 in response to the write A2 command and thus, will not issue a transfer ready signal to initiator 702. Ingress port 710 will not issue a transfer ready signal to initiator 702 until it is able to route data received from the initiator to both of the physical targets, as determined by a transfer ready received from both targets. The synchronization operation is similarly deadlocked. After providing the read S1 command to target 706, the switch waits for one or more data frames from target 706 in response. Because target 706 has issued its only transfer ready signal in response to the write A1 command, however, it is unable to return the read data requested by the read S1 command. Target 706 may block incoming commands when commands are pending for each of its transfer ready signal(s).

Because of their mutual dependence on the same transfer ready signals or target availability, the write operation and synchronization are deadlocked. Ingress port 710 will not receive a XFER_RDYA2 signal until target 708 receives write data associated with the write S2 command which will free its only transfer ready signal. Physical target 708, however, will not receive write data associated with the write S2 command because target 706 cannot return the read data. Target 706 is waiting for the write data of the write A1 command. Target 706 will not receive the write A1 data, however, because target 708 cannot return a transfer ready signal for the write A command until it receives the data from target 706 for the write S2 command. Thus, the storage switch and each of the physical targets are deadlocked. Each operation is dependent upon the completion of the other operation in order to receive the transfer ready signal or data it needs. Because the needed resources for each operation are tied up with the other operation, the resources will not be released in order to complete either operation. Thus, each target is deadlocked waiting for data from the switch and the switch is deadlocked waiting for a transfer ready signal or data from each target.

Maintaining a mirrored VLU online for unbuffered write operations during mirror synchronization can also cause inconsistencies between the data stored in each of the physical targets corresponding to a mirrored virtual target. FIGS. 14a through 14d depict a storage area network and a scenario that can cause such an inconsistency. In the example presented with respect to FIGS. 14a through 14d, it is assumed that physical target 708 is able to issue at least two transfer ready signals at a given time. That is to say, physical target 708 is able to accept write data or verification data associated with at least two commands at the same time. At time t=0, depicted in FIG. 14a, ingress port 710 has multicast a write A command received from initiator 702 to egress port 712 and egress port 714. Additionally, copy service manager 716 has issued a write S2 command to the destination IVLU of IVT 711. The write S2 command has been forwarded to egress port 714.

Figure 14A:
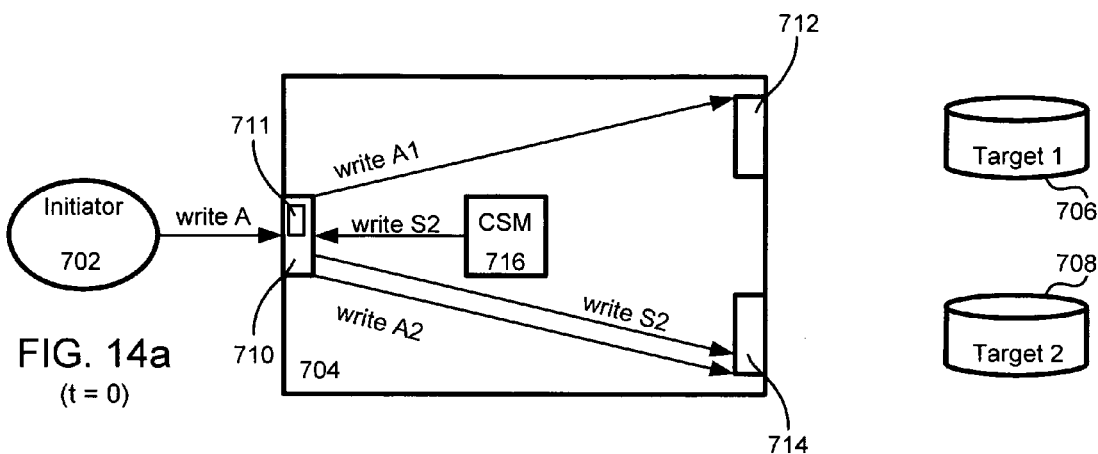
FIGS. 14a-14d depict a block diagram of a storage area network and a potential mirror inconsistency arising during mirror synchronization.
Figure 14B:
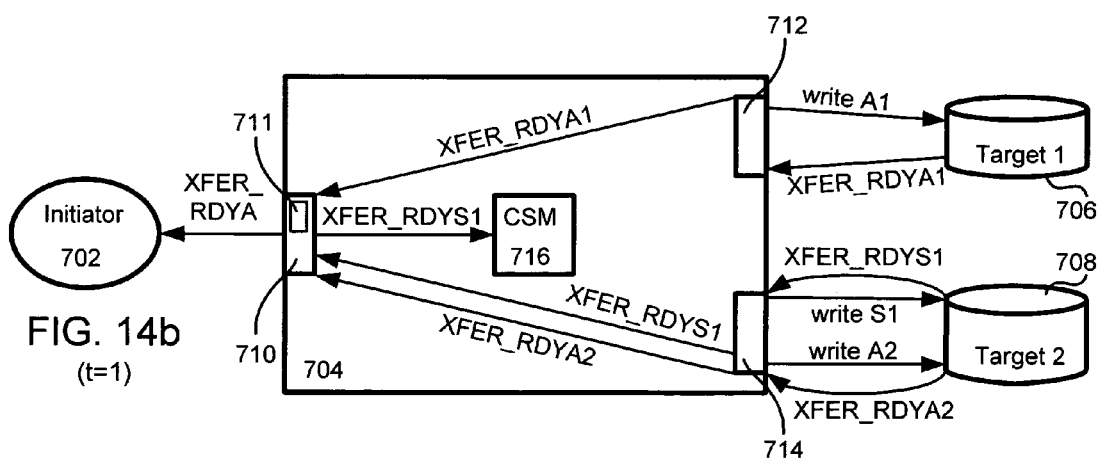

At time t=1, depicted in FIG. 14b, egress port 712 has issued the write A1 command to physical target 706 and received a XFER_RDYA1 signal. Egress port 714 has issued the write S2 command to physical target 708 and received a XFER_RDYS1 signal. Also, egress port 714 has issued the write A2 command to physical target 708 and received a XFER_RDYA2 signal. Egress port 712 has returned the XFER_RDYA1 signal to ingress port 710. Egress port 714 has returned the XFER_RDYS1 signal to ingress port 710 which has forwarded it to copy service manager 716. Egress port 714 has also forwarded the XFER_RDYA2 signal to ingress port 710. A XFER_RDYA signal has been forwarded to initiator 702 to begin the data transfer for the write A command.

Figure 14C:
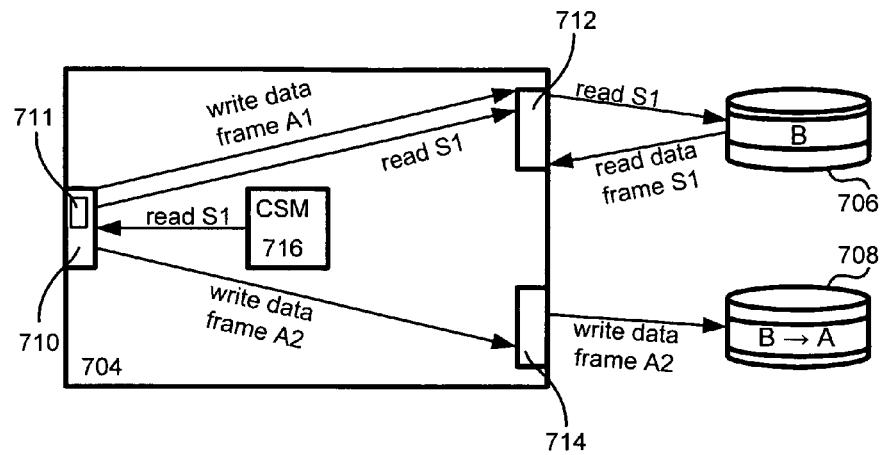

At time t=2, depicted in FIG. 14c, ingress port 710 has multicast write data frames received from the initiator 702 to egress port 712 and egress port. CSM 716 has issued a read S1 command the source IVLU of IVT 711. The read command has been forwarded to egress port 712. Egress port 712 has in turn provided the read S1 command to physical target 706 and received a read data frame S1 in response thereto. Egress port 714 has issued write data frame A2 to physical target 708 but egress port 712 has not yet issued write data frame A1 to target 706. As depicted in FIG. 14c, the data within physical target 706 associated with the read S1 command is denoted as 'B' and is returned to egress port 712 as read data frame S1. Similarly, physical target 708 contains an exact copy of data 'B'. In FIG. 14c, write data frame A2 has overwritten data 'B' with data 'A' at time t=2. Thus, after completion of each of the commands and operations depicted in FIG. 14c, physical target 706 is storing data 'B' and physical target 708 is storing data 'A' at corresponding blocks of each target.

Figure 14D:
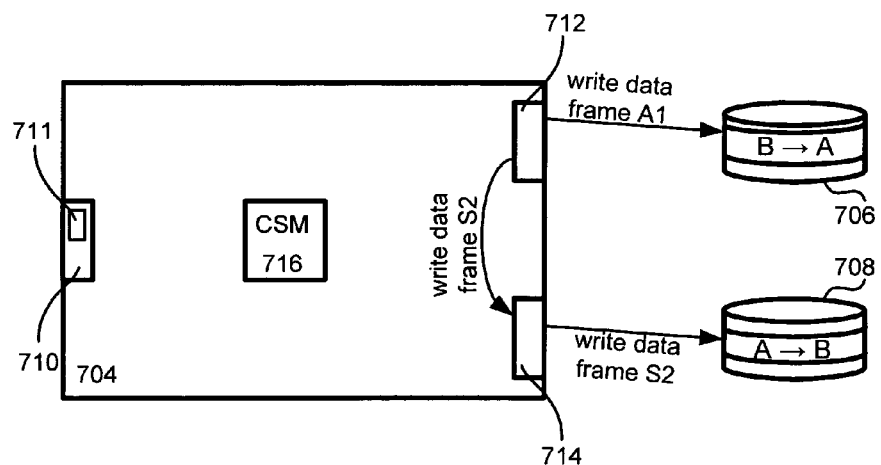

At time t=3, depicted in FIG. 14d, egress port 712 has issued write data frame A1 to target 706. Data 'B' within target 706 has been overwritten with data 'A' from write data frame A1. Also at time t=3, egress port 712 has converted read data frame S1 to write data frame S2 and forwarded it to egress port 714. Egress port 714 in turn issues the write data frame S2 to physical target 708. Write data frame S2 is carrying data 'B' associated with the data read from physical target 706. Accordingly, write data frame S2 has overwritten data 'A' with data 'B'.

Hence, at time t=3, the physical targets have entered into a state of inconsistency with physical target 706 storing data 'A' and physical target 708 storing data 'B' in corresponding locations. Physical target 706 is storing the correct or more recent data which is associated with the write A command. However, physical target 708 is storing data 'B' which was read from physical target 706 prior to data 'A' being written to physical target 706. Because write data frame A2 arrived at physical target 708 prior to the write data associated with the read S1 synchronization command, and because the read command S1 was sent to target 706 prior to the write A command, the data of the mirrored members is inconsistent.

Figure 15A:
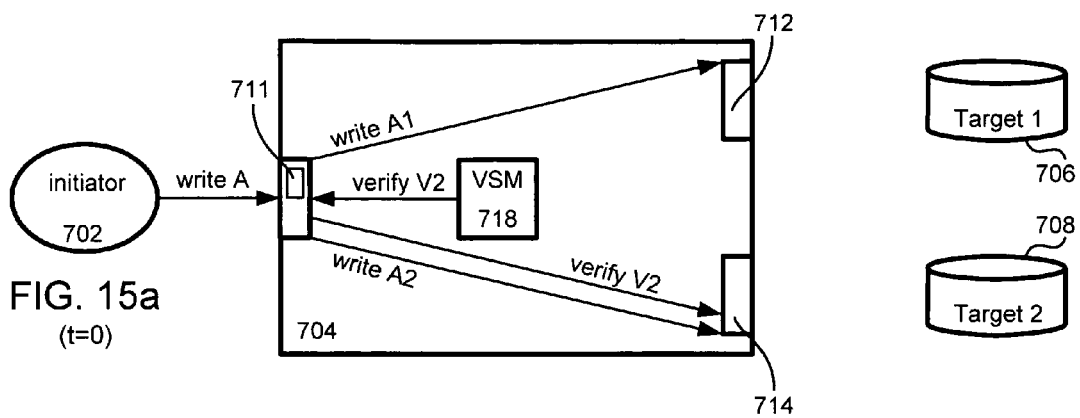
FIGS. 15a-15c depict a block diagram of a storage area network and a potential deadlock scenario arising during mirror verification.
Figure 15B:
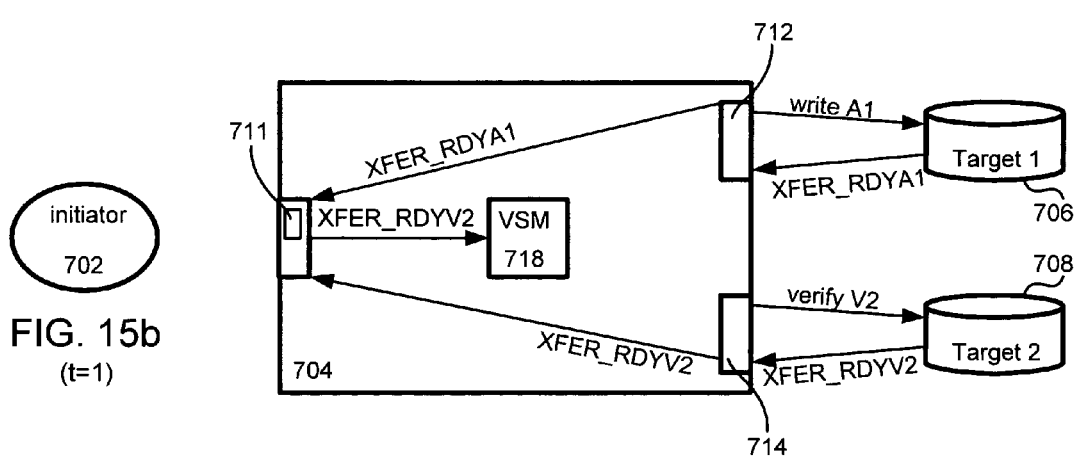
Figure 15C:
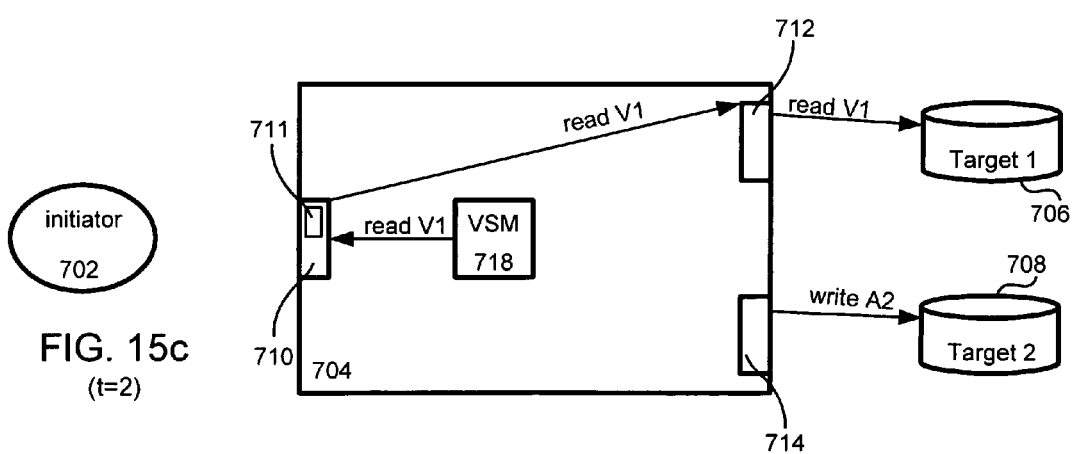

The problem of potential deadlock and inconsistencies during mirror synchronization operations can similarly occur during mirror verification operations. In mirror verification, data is read from a source target of the mirrored virtual target and provided to one or more destination targets to verify that each target is storing the same data. FIGS. 15a-15c depict potential deadlock that can occur during mirror verification. At time t=0, depicted in FIG. 15a, initiator 702 has issued a write A command for the mirrored virtual target having mirrored members corresponding to targets 706 and 708. The write A command is received at ingress port 710 and multicast to egress ports 712 and 714. Also at time t=0, verification service manager 718 has issued a verify V2 command associated with a verification operation to the destination IVLU of IVT 711. The write command has been forwarded to egress port 714. In the example depicted in FIG. 15a through 15c, it is again assumed that physical targets 706 and 708 can only issue one transfer ready signal at a given time. At time t=1, depicted in FIG. 15b, egress port 712 has provided the write A1 command to target 706 and egress port 714 has provided the verify V2 command to target 708. Egress port 714 has not yet provided the write A2 command to physical target 708. In response to the write A1 command, physical target 706 has issued a XFER_RDYA1 signal, and in response to the verify V2 command, physical target 708 has issued a XFER_RDYV2 signal. The XFER_RDYA1 signal has been returned to ingress port 710 and the XFER_RDYV2 signal has been returned to verification service manager 718 via ingress port 710.

At time t=2, depicted in FIG. 15c, egress port 712 has issued the read V1 command to physical target 706 and egress port 714 has issued the write A2 command to physical target 708. Because each of the targets can only issue one transfer ready signal, physical target 706 will not issue a read data frame in response to the read V1 command and physical target 708 will not return a XFER_RDYA2 signal in response to the write A2 command. Ingress port 710 will not receive the XFER_RDYA2 signal and thus, cannot issue a transfer ready response to initiator 702. Likewise, egress port 712 will not receive a read data frame from target 706 and will be unable to provide any write data to target 708 via egress port 714. Additionally, target 706 is waiting for write data in response to its issued transfer ready signal for the write A1 command and target 708 is awaiting verification data in response to its issued XFER_RDYV2 signal. Switch 704 and physical targets 706 and 708 are deadlocked due to the mutual dependence of each operation.

Figure 16A:
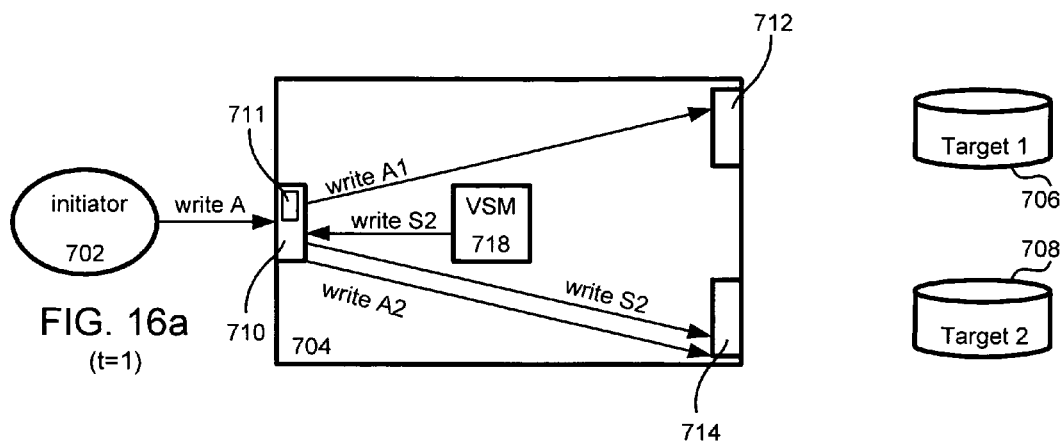
FIGS. 16a-16d depict a block diagram of a storage area network and a potential false verification failure arising during mirror verification.
Figure 16B:
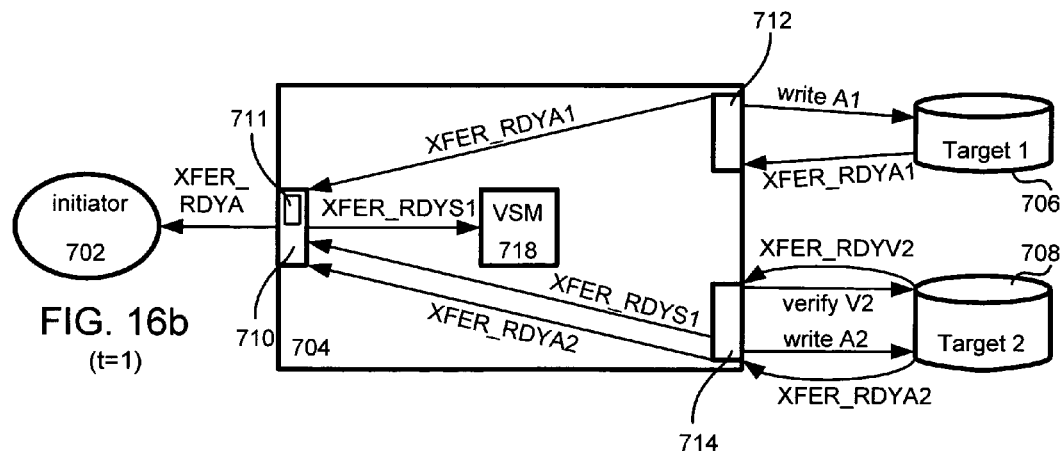
Figure 16C:
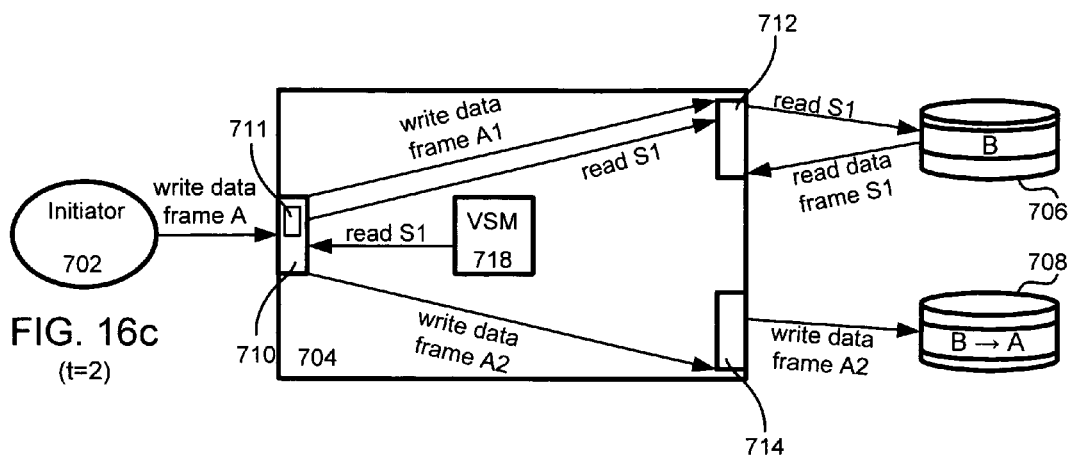

Similar to a mirror synchronization operation causing member inconsistency, a mirror verification operation can cause a false verification failure response. Such a scenario is depicted in FIGS. 16a through 16d. In FIGS. 16a through 16c, it is assumed that target 708 can issue 2 or more transfer ready signals at a timer. At time t=0, depicted in FIG. 16a, verification service manager 718 has issued a verify V2 command to the destination IVLU of IVLU 717. The verify command has been forwarded to egress port 714. Ingress port 710 has multicast a write A command to egress ports 712 and 714. At time t=1, depicted in FIG. 16b, egress port 712 has issued the write A1 command to physical target 706, received a XFER_RDYA1 response, and forwarded the response to ingress port 710. Egress port 714 has issued the verify V2 command to physical target 708, received a XFER_RDYV2 response, and forwarded the response to ingress port 710 which has forwarded it to verification service manager 718. Egress port 714 has issued a write A2 command to physical target 708, received a XFER_RDYA2 response, and forwarded the response to ingress port 710. Ingress port 710 has provided a XFER_RDY signal to initiator 702.

At time t=2, depicted in FIG. 16c, ingress port 710 has received a write data frame from initiator 702 and multicast it to egress port 712 and 714 Verification service manager 718 has provided a read V1 command to ingress port 711 which has forwarded it to egress port 712. Egress port 712 has forwarded the read V1 command to physical target 706 and received a read data frame V1. The data associated with the read V1 command and read data frame V1 is data 'B'. Write data frame A2 contains data 'A' which overwrites data 'B' in target 708 at a location corresponding to a location of data 'B' at target 706.

Figure 16D:
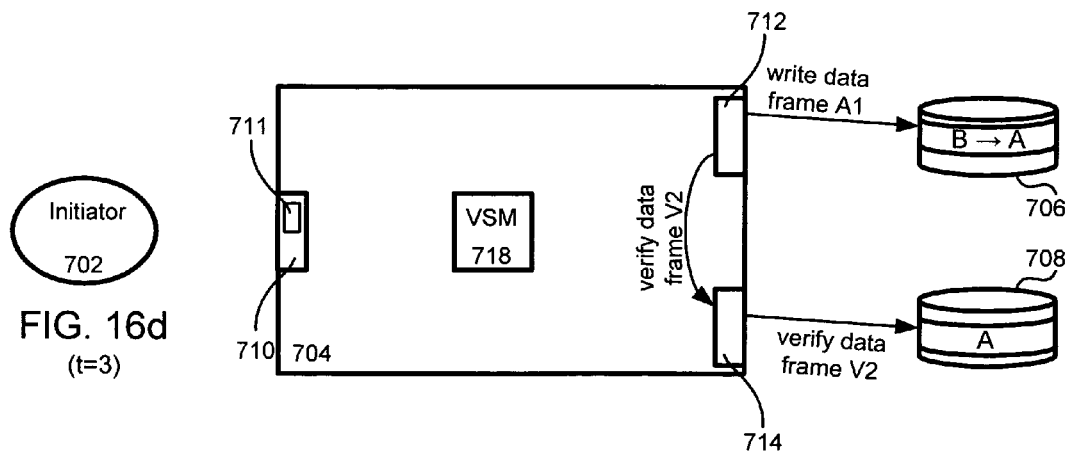

At time t=3, depicted in FIG. 16d, write data frame A1 overwrites data 'B' with data 'A' at target 706. Also at time t=3, egress port 712 has converted read data frame V1 to verify data frame V2 and forwarded the frame to egress port 714. Egress port 714 has provided verify data frame V2 to physical target 708. Verify data frame V2 contains data 'B' as read from physical target 706 at time t=2. Accordingly, a failure response will be returned to storage switch 704 in response to frame V2 because data 'B' will not match data 'A'. The failure response is false and occurs only because of the difference in timing between the write command and the verify command. The data was read from target 706 prior to the write A command changing the data at physical target 706. The data read from target 706 is verified against the data at target 708 that had been replaced before the verification took place. Accordingly, even though each physical target is storing the correct data, a false verification failure occurs because of the timing involved in each of the respective commands.

Deadlock Avoidance and Mirror Consistency

In accordance with various embodiments, the ability of physical targets to issue transfer ready signals is managed in order to avoid deadlock situations such as those described with respect to FIGS. 13a-16d. Additionally, the number of outstanding commands that can be issued to a physical target can be managed to avoid inconsistencies and false verification failures between members of a mirrored virtual target. For example, an indication of the number of available transfer ready signals from a physical target can be maintained in the storage switch. When a command requiring access to a physical target is issued and the command is associated with a mirrored operation, the ability of the target to issue a transfer ready signal can be ensured prior to issuing the command to the target. In one embodiment, the management of a target's ability to issue transfer ready signals is implemented as a resource table. This table can contain an indication of the number of transfer ready signals available from a target in order to avoid deadlock caused by the inability of an initiator or switch to receive transfer ready signals from each of the necessary targets. Resources can be provisioned in the table that correspond to transfer ready signals available from the target. External and internal initiator commands can be managed by checking the table for an available resource that indicates the availability of a transfer ready signal from a target. Only when a command acquires a resource from the table, or otherwise determines that a transfer ready signal is available from each physical target involved in the command, is the command forwarded to any of the targets.

In one embodiment, an indication of whether there are any outstanding or pending commands for a physical target can be maintained in a storage switch to avoid inconsistencies and false verification failures. The maximum number of outstanding commands for a target can be limited to one during synchronization and verification operations. This can ensure that no inconsistency is caused by the issuance of co-pending commands to mirrored physical targets and the subsequent execution taking place at different times such that inconsistencies or false verification failures occur. The indication can be used to lock a physical target from further commands while a command is pending. A resource table indicating the number of transfer ready signals available from a target can function as such an indication or lock. The maximum number of transfer ready signal resources as provided in the table can be limited to one to limit the number of outstanding commands pending for a target at any given time during synchronization or verification to one.

FIGS. 17a-17f depict a functional block diagram of a SAN including a storage switch 704 implemented in accordance with an embodiment to effectively manage transfer ready signals of to avoid deadlock situations, inconsistencies between mirrored members, and false verification failures. A communication and data flow depicted in FIGS. 17a-17f illustrates an exemplary write operation to a mirrored virtual target having members corresponding to targets 706 and 708. Targets 706 and 708 can each represent an individual LU of a physical device or an entire physical device that may include one or more LUs. Although FIGS. 17a-17f depict a network including two targets each corresponding to a member of a virtual target, it will be appreciated that embodiments can be implemented using any number of targets corresponding to any number of members of a virtual target. For example, in one embodiment, a mirrored virtual target can include three, four, or more members.

Initiator 702 issues a write A command to storage switch 704 at time t=0. After receiving the write A command at the ingress port, requests A1 and A2 are sent to egress ports 712 and 714 connected to the targets associated with the write A command. Each egress port receiving a request checks an indication or table of the number of transfer ready signals available from the respective physical target to determine if a signal is available. For example, a PPU associated with port 712 can check a resource table stored in memory associated with the port and PPU to acquire a resource representing the availability of a transfer ready signal from target 706, thus determining the availability of a XFER_RDY frame from target 706.

A value indicating the availability of a XFER_RDY frame from a physical target coupled with an egress port can be maintained in a memory associated with the egress port. For example, a resource table indicating the availability of transfer ready signals from physical target 706, connected to egress port 712, can be maintained in a memory such as SRAM $305_3$ of FIG. 3, while a resource table indicating the availability of transfer ready resources from physical target, 708, connected to egress port 714, can be maintained in another memory such as SRAM $305_4$ of FIG. 3. In one embodiment, a memory associated with a particular port (e.g., memories $305_1$, $305_2$, $305_3$, and $305_4$ associated with ports $302_a$-$302_{4b}$) is used to maintain a resource table for physical devices connected to that port. In another embodiment, one or more resource tables for one or more physical devices connected to a switch can be maintained in a single memory accessible to each port of the switch.

Figure 17A:
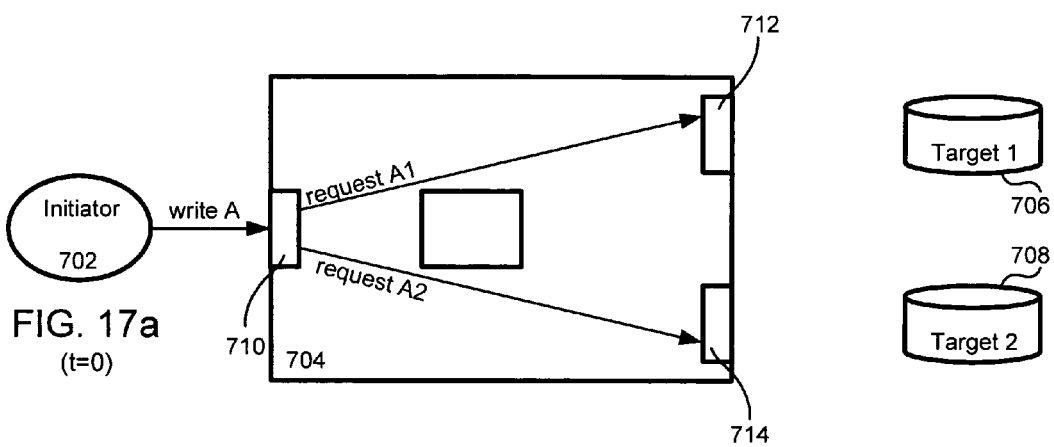
FIGS. 17a-17f depict a block diagram of a storage area network including a write command and data flow of a write operation for a mirrored virtual target in accordance with one embodiment.
Figure 17B:
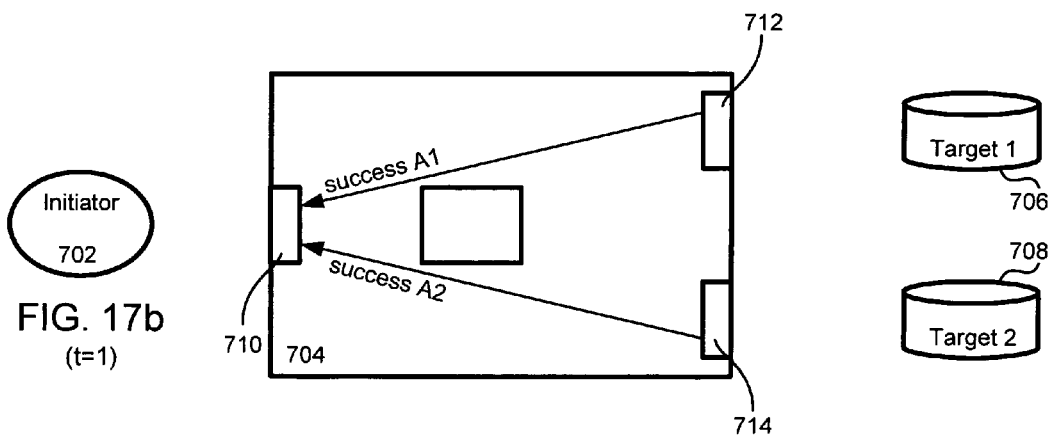
Figure 17C:
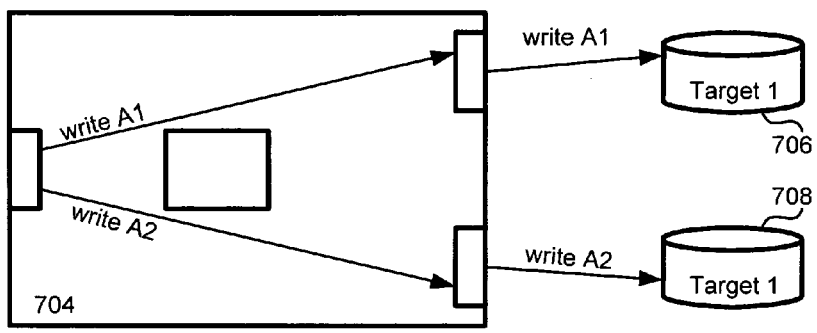

If a transfer ready resource is available from the table, the egress port, via an associated packet processing unit for example, can decrement the value or number of resources in the table and send a success response back to the ingress port issuing the request command. In FIG. 17b, at time t=1, success responses are issued by egress ports 712 and 714 to ingress port 710. If the virtual target includes more than two physical targets, each egress port connected to a physical target of the virtual target will return a success (or failure) response to the ingress port. In this example, each of the egress ports was able to acquire a transfer ready resource and determine that the respective physical targets can issue a transfer ready signal. After receiving success responses A1 and A2, ingress port 710 multicasts (via traffic managers and the switch fabric, for example) write commands (write A1 and write A2) to each of the egress ports as illustrated in FIG. 17c. The egress ports then issue the write commands to the physical targets.

Figure 17D:
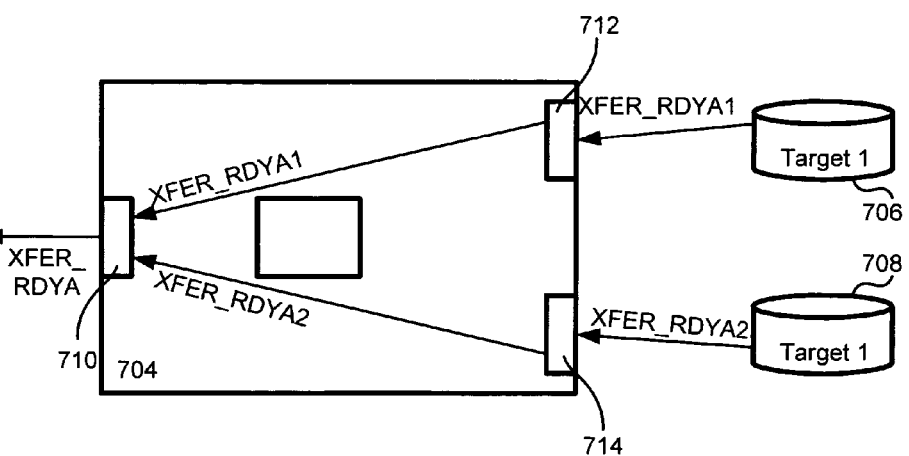

After issuing the write commands to the physical targets, each of the physical targets will return a XFER_RDY frame to the egress ports, as illustrated in FIG. 17d. The egress ports will return the XFER_RDY frames to ingress port 710. After each of the XFER_RDY frames are received by ingress port 710, a XFER_RDY frame is returned to initiator 702. Upon receipt of the XFER_RDY frame, initiator 702 can provide one or more data frames to storage switch 704. In one embodiment, the XFER_RDY frame specifies the maximum number of packets the initiator should issue, the number being the lowest number returned by a physical target. Storage switch 704 can then multicast the data to physical targets 706 and 708, through egress ports 712 and 714, without buffering the data in the storage switch.

Figure 17E:
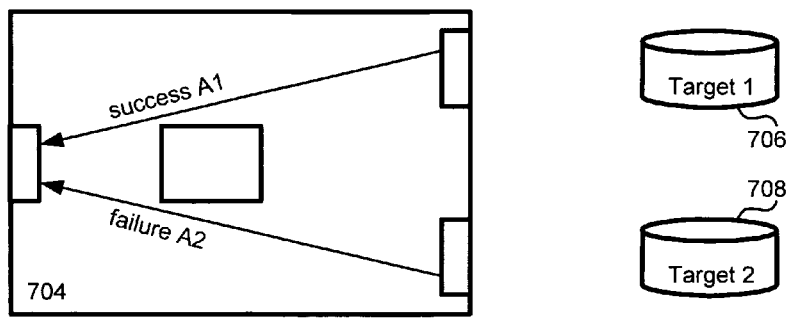
Figure 17F:
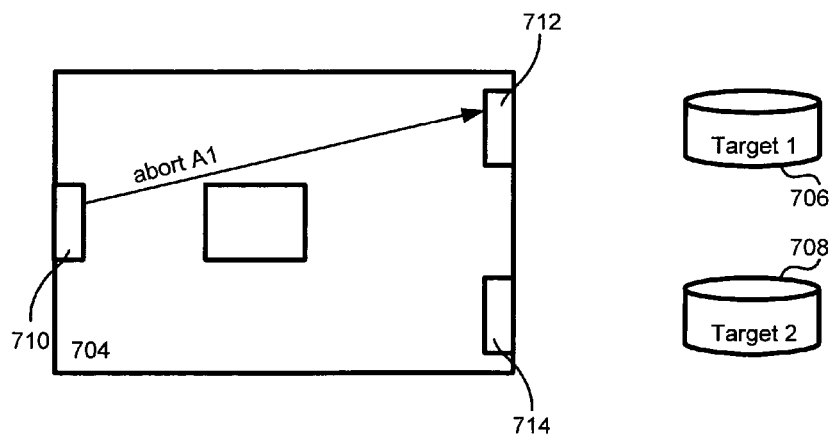

FIG. 17e illustrates a scenario where a transfer ready signal is not available from a physical target. Egress port 712 confirms that a XFER_RDY frame is available from target 706 and provides a success response, while egress port 714 is unable to confirm the availability of a XFER_RDY frame from target 708. Because the egress ports decrement the value (e.g., decrement the number of resources in the table) indicating the availability of transfer ready signals from a physical target upon confirming the availability of a transfer ready signal, abort messages are sent to the egress ports sending success responses if any egress port returns a failure response. As depicted in FIG. 17f, ingress port 710 issues an abort A1 command to egress port 712 so that the port can increment the transfer ready resource value associated with physical target 706 to indicate the availability of the previously allocated signal. In this manner, egress port 712 can determine that physical target 706 is available to receive a further command in response to a subsequent request.

Various indications of the availability of transfer ready signals from targets can be used in accordance with various embodiments. In one embodiment, a resource table is established that indicates the number of transfer ready signals a target has available by using resources that correspond to transfer ready signals from the target. The total number of transfer ready signals a target can issue can be determined from device specifications in one embodiment and provided to storage switch 704 through a management station. In another embodiment, the total number can be determined dynamically during a discovery process. The switch can issue a command to the target and determine if a transfer ready signal is returned. Without responding to the target to release the signal, the switch can issue another command and determine if a transfer ready signal is returned. The switch can determine the total number of requests a target can issue by issuing commands until no signal is returned. This total number of signals can be provisioned as resources to the resource table. In other embodiments, a value of one can be used by default to indicate that a target has a maximum of one available transfer ready signal since all targets will have a minimum of one available transfer ready signal. For example, a value of one could be used for each individual LU of a device to indicate a maximum of one available transfer ready signal for each LU. In other embodiments, a maximum value of one could be used for an overall device or storage subsystem to indicate a maximum of one available transfer ready signal for the entire device or system.

In accordance with one embodiment, the number of transfer ready signals a physical device can issue per LUN is provisioned in addition to or in place of the number of signals the device can issue per port. For example, FIG. 5a depicts a physical device 1062 having three logical units: LU1, LU2, and LU3. An entry in a table for this target may indicate that the physical device can issue 3 transfer ready signals per port and 2 transfer ready signals per LUN. In this manner, an egress port can determine if a target can issue the needed transfer ready signals at the port and/or LUN level. For example, a write command to a virtual target may include writing data to LU1. The egress port connected to device 106, may determine that one signal is available for the port of the target but that no signals are available for LU1. Accordingly, the egress port can return a failure response to the requesting ingress port.

In addition to write commands, commands associated with mirror synchronization or verification operations are managed to avoid deadlock, inconsistencies, and false verification failures in embodiments. FIGS. 18a through 18f depict an exemplary storage area network and a command flow for performing a mirror synchronization operation in accordance with one embodiment. At time t=0, copy service manager 716 is synchronizing targets 706 and 708 and issues a write S2 command to the destination IVLU of IVT 711 at ingress port 710. Ingress port 710 issues a request A1 command to egress port 712 and a request A2 command to egress port 714. Each target 706 and 708 can represent a physical device or individual LUs of a physical device. After receiving a request, each egress port checks a resource table or other indication of the availability of transfer ready signals to determine whether any outstanding commands are pending for the respective physical target. Egress port 712 determines whether any outstanding requests are pending for physical target 706 and egress port 714 determines if any outstanding requests are pending for physical target 708.

Any suitable indication of whether a command is pending for a target can be used. The indication of a maximum of one available transfer ready signal can be maintained for a physical device or a LU of a physical device. In the former, the device will be limited to processing one pending command at a time while in the latter, each individual LU of a device will be limited to processing one command at a time. By providing indications at the LU level rather than device level, performance can be increased by making the overall device more available. In one embodiment, the indication is implemented as a resource table representing a maximum of one resource or one available transfer ready signal. Once mirror synchronization or verification begins, the resource table can be decremented, if necessary, to include a maximum number of available transfer ready signals of just one. Once a command or request is issued for the target and a transfer ready signal is issued, the resource table is decremented to zero to indicate that no transfer ready signals are available. In this manner, the resource table functions as a lock to ensure that only one command is pending for the physical target at any given time. The same indication can be used during synchronization and verification operations as during normal operation. By decrementing the table after beginning a synchronization or verification operation to one to indicate that a maximum of one transfer ready signal is available, it can be ensured that only one request will be pending at a time.

If there are no pending commands for the physical target, the egress port returns a success response after updating the indication to indicate that a request or command is now pending for the physical target. For example, if a resource table implementation is being used, the value associated with the physical target can be decremented from one to zero to indicate that a request is now pending for the target and that no further commands can be processed.

In the example depicted in FIG. 18b, egress ports 712 and 714 both confirm that the physical targets have no outstanding commands and return success S1 and success S2 responses. In response to receiving success responses from each target involved in the ongoing command, ingress port sends an abort S1 command to the egress port connected to the source target 706. The abort S1 command frees the allocated resource at the egress port for the transaction. Because the resource remains allocated at egress port 714 for the destination target 708, deadlock will be avoided since any commands for the mirrored target won't be able to receive resources for each target to begin processing a command. By freeing the resource at the egress port, the source target is able to process other commands such as a write command for a mirrored virtual target including the source target and another target besides destination target 708 as members.

Figure 18C:
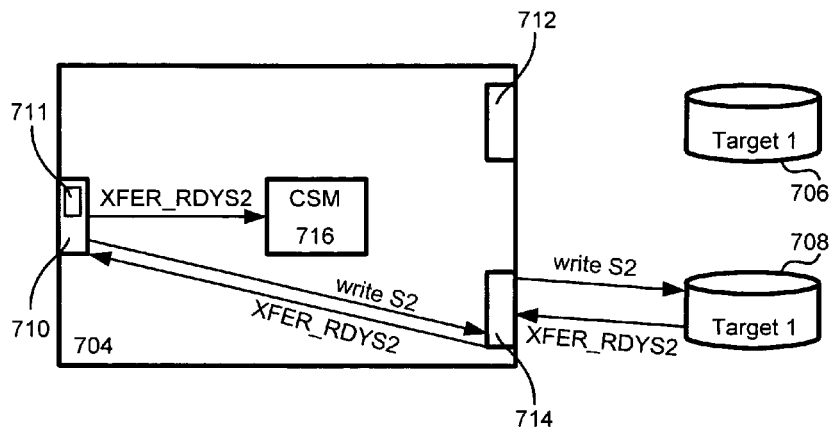

At time t=2, depicted in FIG. 18c, ingress port 710 issues the write S2 command to egress port 714 which forwards the command to physical target 708. Physical target 708 returns a XFER_RDYS2 signal to egress port 714 which is forwarded through ingress port 710 to copy service manager 716.

Figure 18D:
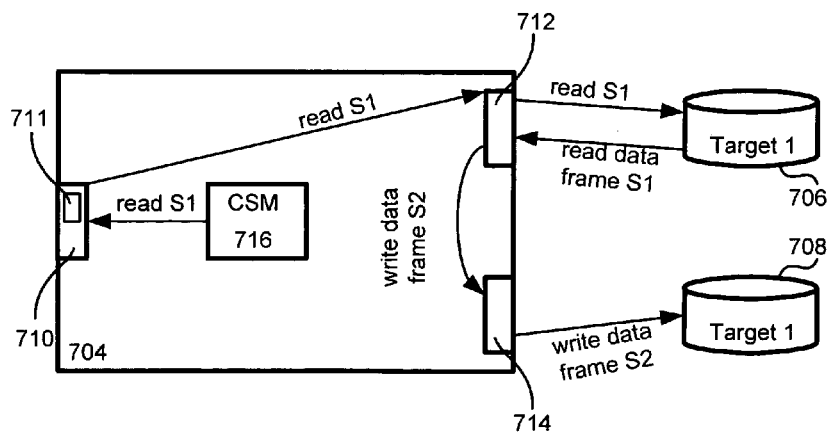

At time t=3, depicted in FIG. 18d, copy service manager 716 issues a read SI command to the source IVLU of IVT 711. Ingress port 710 forwards the command to egress port 712. Egress port 712 forwards the read S1 command to physical target 706 which returns a read data frame S1. The read data frame is received and converted to write data frame S2 and forwarded to egress port 714. In other embodiments, the conversion from read data to write data can be done at a third port. For example, read data frame S1 can be routed through port 712 to a third port where the conversion from read data to write data is performed. That port will then forward the write data frame S2 to egress port 714. Egress port 714 forwards write data frame S2 to physical target 708. After the data is written to target 708, a response is provided to the storage switch to indicate that the operation is complete. Once the response is received at egress port 714, the indication of the outstanding request for the physical target can be updated to indicate that no outstanding requests are now pending. For example, a resource table can be incremented from zero to one to indicate that one available transfer ready signal is available from the physical target.

Figure 18E:
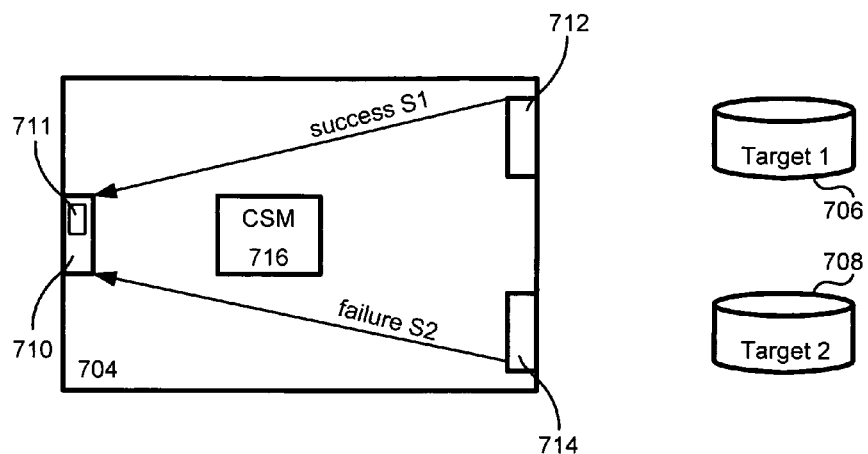

FIG. 18e depicts time t=1 in an alternate scenario where an outstanding request is pending for a target. A failure S2 response is provided from egress port 714 to ingress port 710 after it is determined that a command is outstanding for target 708.

Figure 18F:
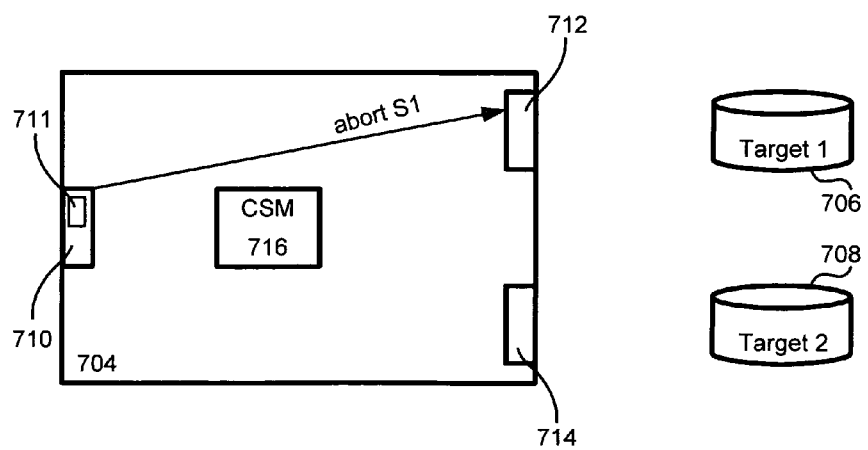

At time t=2, depicted in FIG. 18f, copy service manager 716 issues an abort S1 command to egress port 712 to free the resource allocated at port 712. Egress port 712 increments the resource table (or unlocks target 706) to indicate that no outstanding commands are pending for the target.

Figure 19A:
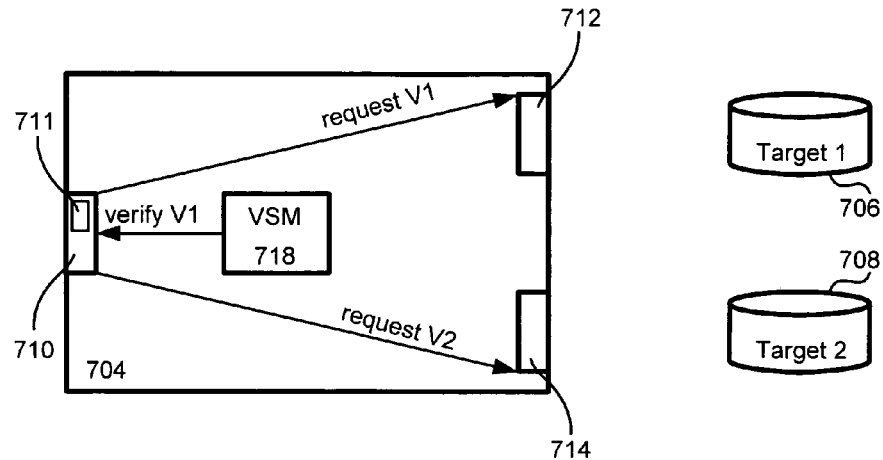
FIGS. 19a-19f depict a block diagram of a storage area network including a command and data flow of a verify operation for a mirrored virtual target in accordance with one embodiment.

In a similar fashion to that previously described with respect to the mirror synchronization operation, mirror verification in accordance with embodiments can utilize a locking mechanism or resource table to ensure that only one request is pending for a physical target at a given time during verification. At time t=0, depicted in FIG. 19a, verification service manager 718 issues a verify V2 command to the destination member of IVLU 711. Ingress port 710 then issues a request V1 command to egress port 712 and a request V2 command to egress port 714. In response to the requests, each egress port checks an indication or resource table to determine if there are any outstanding commands pending for physical target 706 or 708. As previously described, the resource table can be provisioned to indicate a total number of transfer ready signals available from the target. When an initial mirror verification operation begins, this resource table can be decremented to one to indicate that a maximum of one available transfer ready signal is available. In other embodiments, a simple locking mechanism can be used in place of a resource table. The locking mechanism can include two indications, one to indicate that the physical target is processing pending commands and one indication to indicate that the physical target is not. As with the resource table, the locking mechanism can be implemented at the device level to limit pending commands for the overall device to one or at the LU level to limit pending commands for each individual LU to one.

Figure 19B:
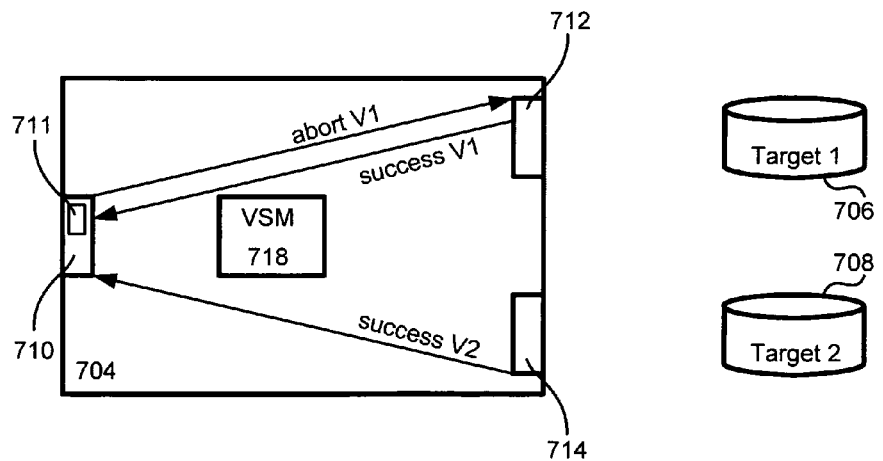
Figure 19C:
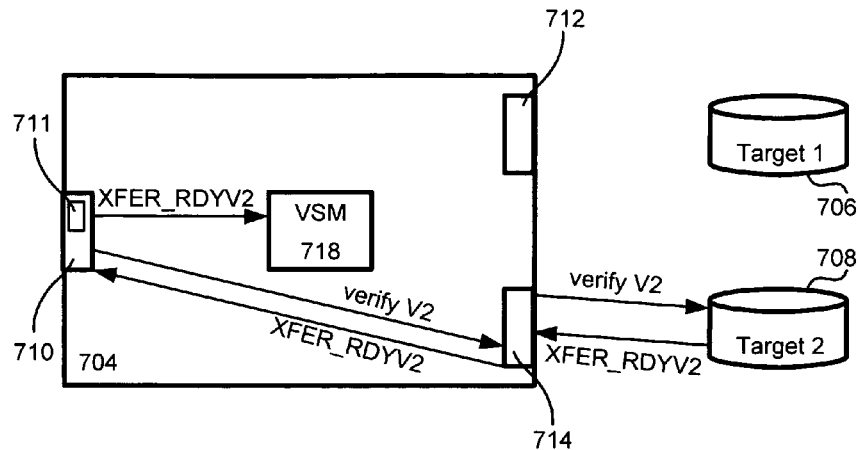
Figure 19D:
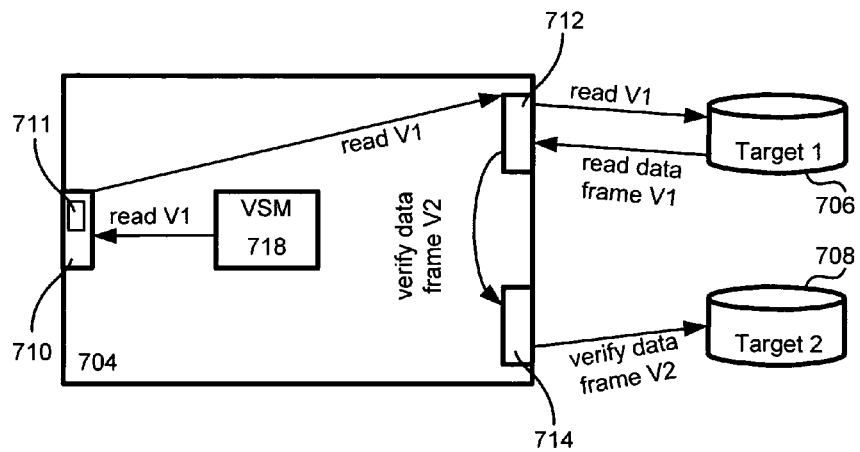

At time t=1, depicted in FIG. 19b, each egress port returns a success response to VSM 718. To free the resource allocated for the source target, an abort V1 command is issued to egress port 712. At time t=2, depicted in FIG. 19c, ingress port 710 issues the verify V2 command to egress port 714. Egress port 714 issues the verify V2 command to target 708 which returns a XFER_RDYV2 signal. At time t=3, depicted in FIG. 19d, VSM 718 issues a read V1 command after receiving the XFER_RDYV2 signal from ingress port 710. The read V1 command is received at egress port 712 and forwarded to target 706. Target 706 returns read data frame V1. The read data frame is converted to verify data frame V2 at egress port 712 (or another port in other embodiments as previously described) and then forwarded to egress port 714. Egress port 714 forwards the verify data frame V2 to physical target 708 which verifies whether the data associated with the data frame is contained and properly stored within physical target 708.

Figure 19E:
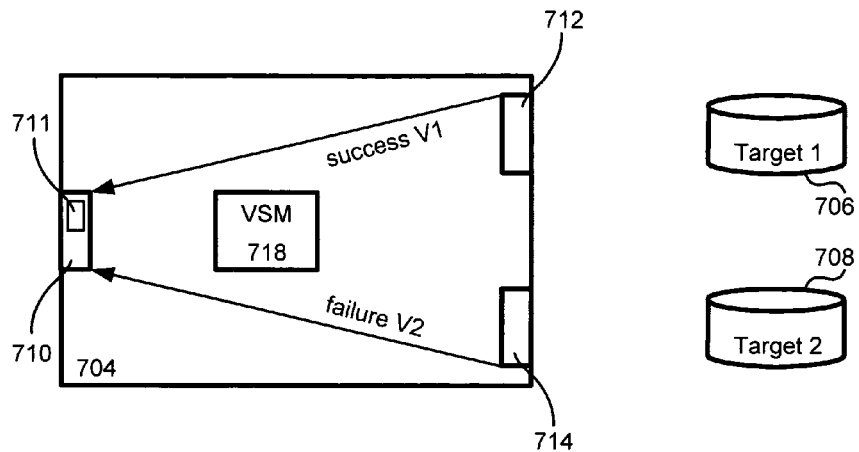
Figure 19F:
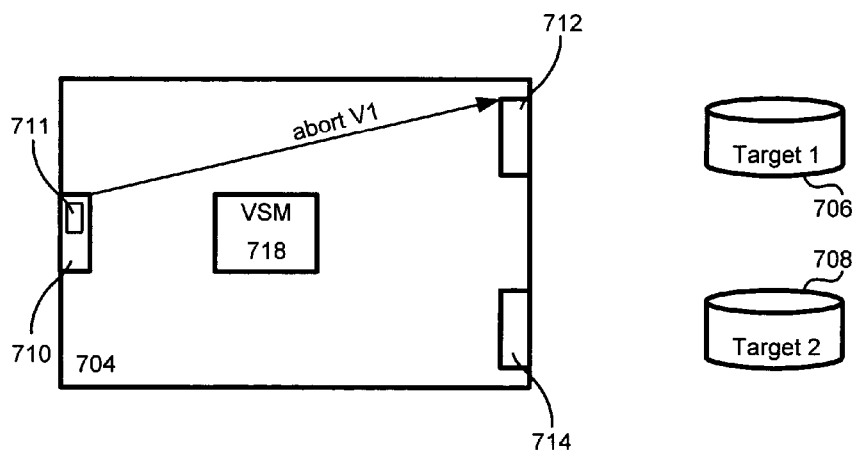

If at time t=1, one of the egress ports determines that the associated physical target is processing another command, a failure response is returned to the ingress port. Such a scenario is depicted in FIG. 19e, in which egress port 714 returns a failure V2 response. The failure response indicates that physical target 708 has an outstanding command pending. After receiving a failure response from one of the egress ports, ingress port 710 provides an abort command to any port providing a success response. This will free any allocated resources for the physical target (LUN or device) at the egress port. For example, if a resource table is being used and the value of the resource table is decremented from one to zero to indicate that a command is now pending for the target, the abort command can be used to alter the indication to indicate that no commands are now pending for the physical target and that future commands can be processed.

FIG. 20 is a flowchart depicting a mirror synchronization operation in accordance with one embodiment. The mirror synchronization of FIG. 20 begins at step 802, such as in response to a request received from a management station to perform synchronization, in response to a newly provisioned mirrored target, or after determining that one or more members of a mirrored target is unsynchronized. At step 802, an internal initiator sends a write command to one or more destination IVLUs of an IVT provisioned at an ingress port for the synchronization operation. At step 803, the write command is queued at the ingress port. In one embodiment, the write command is queued in a first in/first out buffer at the ingress port. The FIFO can be used to queue all commands for the mirrored virtual target as more fully described hereinafter.

A resource table associated with each physical target (LUN or device) involved in the synchronization is decremented to a maximum value of 1 at step 804, if necessary. In other embodiments, a simple indication of whether or not a command is pending for the associated physical target can be used and step 804 will be unnecessary. Step 804 is also not necessary if the resource table is already provisioned to indicate a maximum number of available transfer ready signals of one. In one embodiment, a resource table can be decremented to one just prior to issuance of each command associated with a synchronization or verification operation.

At step 806, request messages are sent from the ingress port to each of the egress ports associated with a physical target of the mirrored VLU being synchronized. At step 808, each egress port determines whether the physical target with which it is associated is currently processing another command. If the egress port determines that the associated physical target is not currently processing another command, the egress port decrements the value stored in the resource table (or makes another suitable indication) to indicate that the physical target is now processing another command at step 810. At step 812, a success response is returned to the ingress port.

If, at step 808, the egress port determines that the associated physical target is currently processing another command, a failure response is returned to the ingress port at step 814. It will be appreciated that steps 808 through 814 can be performed in parallel at each egress port connected to a target involved in the operation.

The ingress port determines at step 816 whether success responses are received from each of the egress ports. If success responses are received from each egress port, an abort command (or other signal) is sent to the egress port connected to the source physical target at step 817. The abort command can free the allocated resource for the source target to enable the source target to process other commands. Because the resource is not released at the port connected to the destination target(s), deadlock is still avoided. The write command is dequeued and issued to the egress ports of each destination physical target at step 818. The egress ports send the commands to the physical targets at step 820 and receive transfer ready signals in response. The transfer ready signals are sent to the ingress port and on to the internal initiator at step 822. Upon receiving a transfer-ready signal from each destination target, the internal initiator sends a read command to the source IVLU of the IVT at step 824. The read command is forwarded to the source physical target via its associated egress port.

One or more read-data frames are received from the source target at step 826 and converted to write data. The conversion can take place at any number of egress ports. After converting the read-data frame to one or more write-data frames, the write-data frames are sent to the destination targets at step 826. A response is received from each target once the write data has been written. After receiving a response from a target, the egress port will release the resource allocated for the associated command. It will be appreciated by one of ordinary skill in the art that if a transfer-ready signal is returned from a destination target at step 820 that specifies a desired data field length or burst field length that is less than the entire size of an issued write command, steps 824 and 826 can be repeated until all of the data for the write command is provided to the destination targets. The copy-service manager can issue multiple read commands to the source target in accordance with the burst size specified in a transfer-ready signal until a write command is satisfied.

At step 828, it is determined whether there are additional commands to process for the mirror synchronization operation. For example, multiple write commands may be required in order to synchronize an entire VLU. For example, each write command may only be issued for a limited transfer size such as 128K. Accordingly, steps 806 through 826 can be repeated many times in order to synchronize one VLU. If no additional commands are to be processed, as determined at step 828, the mirror synchronization ends at step 830. If, however, there are additional commands to be processed, operation of the flowchart proceeds to step 802 where the next command is issued to the IVLU.

If at step 816 success responses were not received from each egress port, then the flowchart continues to step 832 where abort commands are sent to each of the egress ports that return success responses in order to free any resources allocated for the target at the egress port. Upon receiving an abort command, the egress port increments the resource value to indicate that the allocated resource is now available from the physical target at step 834. An optional random time delay is provided at step 836 to decrease the probability that the events leading to the unavailability of a transfer-ready signal will occur again. At step 838, the command at the head of the queue is accessed. If the command is a synchronization command, as determined at step 840, operation of the flowchart proceeds to step 802 to issue the command to the IVT. If the command is not a synchronization command, it is processed at step 842. Once the head of the FIFO is a synchronization command, processing according to the flowchart can begin again.

Figure 21:
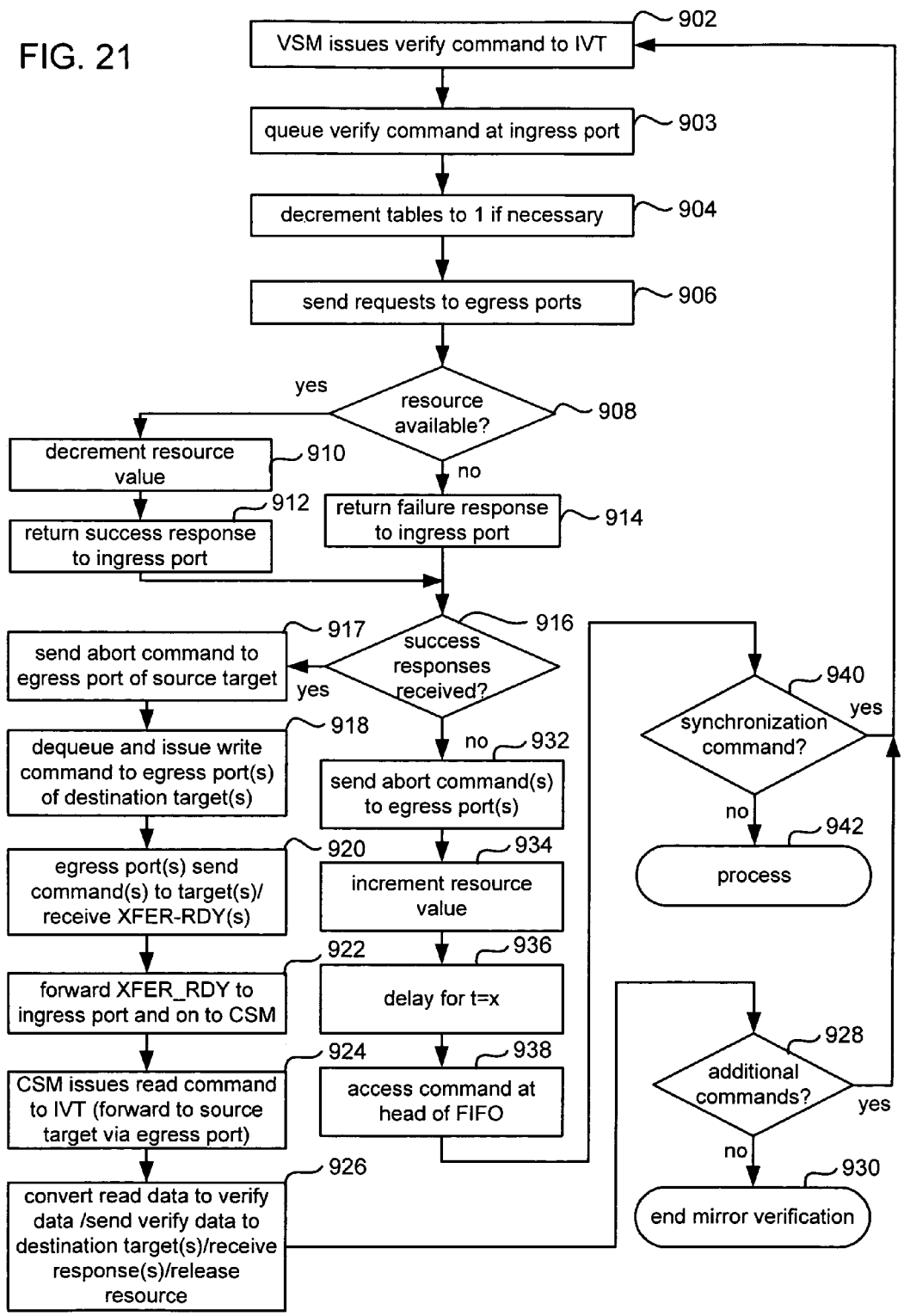
FIG. 21 is s flowchart depicting a verification operation for a mirrored virtual target in accordance with one embodiment.

FIG. 21 depicts a flowchart for performing a mirror verification operation in accordance with one embodiment. Many of the steps involved in the flowchart of FIG. 21 are the same as those depicted with respect to FIG. 20. The verification begins at step 902 where a verify command is issued from an internal initiator to one or more destination IVLUs of an IVT provisioned at an ingress port for the verification operation. At step 903, the command is queued. At step 904, if necessary, the resource tables are decremented to 1 to implement a locking mechanism such that only one command can be outstanding for a physical target (LUN or physical device depending on implementation) at any given time. At step 906, request messages are sent to each egress port involved in the current operation.

At step 908, it is determined whether the physical target is currently processing any other commands. If it is determined that the physical target is not processing any other commands, the resource value or indication is updated at step 910 to indicate that the physical target is now processing another command. A success response is returned to the ingress port at step 912. If a resource is not available from a target, a failure response is returned to the ingress port at step 914.

At step 916, it is determined whether success responses are received from each egress port. If each egress port returns a success response, the internal initiator issues a verify command to the IVT at step 918. The verify command is forwarded to the egress ports of each destination physical target. The egress ports send the verify command to the physical targets and receive transfer-ready responses at step 920. The transfer-ready responses are forwarded to the ingress port and on to the internal initiator at step 922. A read command is sent to the source IVLU of the IVT and forwarded to the source target at step 924. At step 926, the read data is converted to verify data, such as by updating a local header. The verify data is sent to the destination targets for verification. If the verification is successful, a success response is returned to the ingress port at step 926. If the verification was not successful, a failure response is returned at step 926.

After receiving a response, the resource at the egress port (s) is released. At step 928, it is determined whether additional verify commands are needed to complete the mirror verification. If so, operation of the flowchart proceeds to step 902 where the next verify command is issued to the IVT. If there are no additional commands to process, then the mirror synchronization operation ends at step 930.

If at step 916 success responses were not received from each egress port, then abort commands are sent to those egress ports returning success responses at step 932. The resource table or other indication is updated at step 934 to indicate that the physical target for which a success response is returned is no longer processing another command. A random time delay can be provided at step 936, to decrease the probability that the events leading to a failure response occur again. At step 938, the command at the head of the queue is accessed. If the command is a verification command, as determined at step 940, operation of the flowchart continues to step 902 where it is issued to the IVT. If not, the command is processed at step 942. Once the head of the FIFO is a verification command, processing according to the flowchart can begin again.

A circular first in/first out (FIFO) buffer can be used to maintain information relating to write commands, synchronization command, and/or verification commands for mirrored virtual targets. In one embodiment, the FIFO is a circular software FIFO maintained in memory for an ingress port (e.g., SRAM $305_1$ for ingress port $302_{1a}$). When a write command is received from a physical initiator or a write or verify command received from an internal initiator, information relating to the write command can be enqueued in the circular FIFO for processing. The FIFO can be the queue to which commands are placed at step 803 of FIG. 20 and step 903 of FIG. 21. In one embodiment, a FIFO is established for each ingress port (or for each processing unit in embodiments where a single processing unit is dedicated to more than one port as depicted in FIG. 3). In other embodiments, a FIFO can be used for multiple ports or for an entire switch. In one embodiment, a single FIFO is used for all synchronization, verification, and write commands for a virtual target.

In one embodiment, the information queued in the write FIFO buffer is a pointer to an ingress task control block (ITCB) for an incoming write or verify command. As previously discussed, when a command is received, an ITCB can be allocated and placed into memory accessible to the ingress port. The ITCB can specify such information as the Flow ID, VTD ID, CmdSN, and initiator_task_tag (iSCSI PDU) or OX_ID (FCP frame header). The FIFO can reference the write command by its ITCB in order to queue, track, and execute the command. In another embodiment, the FIFO can directly include such information as a task index, flow ID (multicast flow ID), mirroring information (location of targets), target status (returned success or returned failure), and the state of the command (e.g., resources available/not available).

By placing incoming write and verify commands (or information relating thereto) into the circular software FIFO, the ingress port can continue to process other incoming commands. After receiving and queuing information for a write or verify command requiring a mirrored data transfer, request messages can be multicast to the egress ports connected to the physical targets associated with the command. If XFER_RDY frames are available, as determined by the egress ports associated with the physical targets, the process will continue as previously described. The write command can be issued to the targets and then dequeued from the circular FIFO.

If XFER_RDY frames are not available from each of the physical targets associated with the command, the ingress port can maintain the command in the FIFO and continue to process other incoming commands. After a random amount of time, such as between 0 milliseconds and 1 millisecond, the ingress port can check the head of the FIFO and retry the requests associated with the command at the head entry. If the ingress port receives success responses from each of the egress ports, the write command is issued to each of the egress ports and dequeued from the FIFO. The egress ports will transfer the commands to the physical targets. If the ingress port does not receive success responses from each of the egress ports, the command will be maintained in the FIFO and retried after another random amount of time. In one embodiment, the amount of time is the same between retries. In another embodiment, the amount of time is random and changes between retries.

The time period between accesses to the head of the FIFO can be varied, or random, to decrease the probability that event(s) causing multiple and simultaneous (or near simultaneous) requests of transfer ready resources from the same targets will reoccur. As previously discussed, a FIFO may be established for each ingress port of a switch and commands received at each port individually processed. Additionally, multiple switches may be connected to or internal initiators requesting access to the same physical targets. Because multiple switches, ingress ports and/or internal initiators may request the same transfer ready resources of targets at a single time, a random amount of time can be used between accesses to the FIFO head for a particular ingress port to decrease the probability that the multiple ports, switches, and/or initiators will again simultaneously request the same resources. In one embodiment, a single FIFO is established to queue all commands (whether from an internal initiator or external device) for a single virtual target.

In accordance with one embodiment, a timer is started after a command is received and queued into the FIFO. If an entry into the FIFO is not dequeued by the time the timer expires, the entry is marked retired. If a head entry is retired and the FIFO is checked after the random interval, the check will skip the retired entry and move to the next entry. The FIFO will continue to be checked until a non-retired entry is found. After finding a non-retired entry, request messages are sent to the appropriate egress ports associated with the command. If success responses are received at the ingress port in response to each request, the command is immediately dequeued from the FIFO even though it is not at the FIFO head. The entry will then be marked retired. The next time this entry appears at the FIFO head, the entry can be skipped. After the head of the FIFO moves beyond the retired entry, a newly received command can be queued in place of the retired entry. In accordance with one embodiment, if a command is attempted to be queued into the FIFO and the FIFO is full, the command can be rejected by the storage switch. The storage switch can return a busy status or other appropriate command to the physical initiator or internal initiator.

In accordance with one embodiment, an error recovery scheme is provided by the storage switch to prevent mismanagement of transfer ready resources due to message loss within the switch. As previously discussed, after the storage switch receives and queues a command or begins a synchronization or verification command, it will send request messages to the egress ports. These request messages may be lost during transfer between egress and ingress ports or internal initiators and egress ports. If each of the messages are lost, no transfer ready resources will be allocated for the request at any of the egress ports. The command will receive no responses from the egress ports and will remain in the FIFO. As previously described, a timer can be started when a command is first enqueued. The command will be retired from the FIFO at the expiration of the timer. This command will be skipped if it appears at the FIFO head after being retired.

If some messages are lost and some are not, the transfer ready resources will be allocated at the egress ports receiving the request messages causing deadlock at the egress port. For example, a request message may be received at an egress port and a transfer ready resource allocated in response thereto. If a request message is lost on the way to an egress port, the ingress port or internal initiator will not receive responses from every egress port and will wait until the FIFO entry times out and the associated command is retired. An egress port receiving a request and issuing a success response will wait for a command in response to issuance of the success response. Because the ingress port or internal initiator has dropped the command and the egress port is waiting for the command, the ingress and egress ports or internal initiator and egress ports will have essentially lost communication. Since the transfer ready resource of the physical target was allocated at an egress port, other request messages for the same resource will fail and receive failure responses from the egress port due to allocation of the transfer ready resource to the other task.

Using additional timers at the egress port(s) in one embodiment can prevent such a resource depletion situation. When the egress port receives a request message, it can start a task associated with the message and a timer for the associated task. After issuing a success response to the ingress port or internal initiator, the task can be marked, for example, "resource allocated". If a failure response is returned and a resource not allocated, the task can be marked, for example, "resource not allocated".

If the task timer expires, the task will time out at the egress port, prompting the release of the transfer ready resource if it is marked resource allocated. In this manner, new request messages received at the egress port for the same resource, will be able to acquire the resource.

When a response message from an egress port or an abort message from an ingress port or internal initiator is lost, the previously described scheme can be applied in a similar fashion to alleviate potential deadlock. As described, when a resource is allocated, a timed task will run to maintain the resource at the egress port. If communication is lost between an ingress and egress port or internal initiator and egress port, the egress port can always recover by timing out the task and releasing the resource to prevent a resource depletion situation.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A method of synchronizing data storage, comprising:

determining whether at least one read or write command is pending for at least one destination physical target provisioned as at least one member of a mirrored virtual target; and avoiding deadlock by providing a synchronization command to write data from a source physical target to said at least one physical destination target only if no read or write command is pending at said at least one destination physical target;

wherein said step of determining includes determining whether at least one read or write command is pending for said at least one destination physical target by providing a first request to a first egress port in communication with said source physical target and at least one second request to at least one second egress port in communication with said at least one destination physical target;

receiving a first success response if no read or write commands are pending at said source physical target and a first failure response if a read or write command is pending at said source physical target;

receiving a second success response if no read or write commands are pending at said at least one destination physical target and a second failure response if a read or write command is pending at said at least one destination physical target;

updating a resource table to indicate that a read or write command is pending for said source physical target if said first success response is provided, and updating said resource table to indicate that a read or write command is pending for said at least one destination target if said second success response is provided; and further comprising:
providing a first abort command to said first egress port if said first success response is received and said second failure response is received;
updating said resource table to indicate that no read or write commands are pending for said source physical target in response to said first abort command;
providing a second abort command to said at least one second egress port if said first failure response is received and said second success response is received; and
updating said resource table to indicate that no read or write commands are pending for said at least one physical destination target in response to said second abort command.

2. The method of claim 1, further comprising:
providing an indication associated with said at least one destination physical target, said indication includes a first value to indicate that at least one read or write command is pending for said at least one destination physical target and a second value to indicate that no read or write commands are pending for said at least one destination physical target.

3. The method of claim 2, wherein:
said step of determining includes accessing said indication to determine whether at least one read or write command is pending for said at least one destination physical target based on said indication.

4. The method of claim 2, wherein:
said step of providing an indication includes providing said indication in said resource table, and making said resource table accessible to said first egress port in communication with said source physical target.

5. The method of claim 1, wherein:
said first egress port is in communication with a first processing unit, said first processing unit provides said first success response and said first failure response.

6. The method of claim 5, wherein:
said step of determining includes accessing said resource table with said first processing unit to determine whether at least one read or write command is pending for said at least one destination physical target.

7. The method of claim 1, further comprising:
repeating said step of providing said at least one second request if said second failure response is received.

8. The method of claim 1, wherein said resource table comprises:
a first table associated with said source physical target, said first table maintains a first value to indicate that at least one read or write command is pending for said source physical target a second value to indicate that no read or write commands are pending for said source physical target; and
at least one second table associated with said at least one destination physical target, said at least one second table maintains a third value to indicate that at least one read or write command is pending for said at least one destination physical target and a fourth value to indicate that no read or write commands are pending for said at least one destination physical target.

9. The method of claim 1, wherein:
said step of providing a synchronization command comprises providing said synchronization command to said at least one destination physical target only if no read or write command is pending at said source physical target and said at least one destination physical target.

10. The method of claim 1,
wherein said resource table maintains a value indicative of a number of transfer ready signals available from said at least one destination physical target, said value having a maximum value indicative of a maximum number of transfer ready signals available from said at least one destination physical target;
decrementing said maximum value to one prior to said step of determining whether at least one read or write command is pending for said at least one destination physical target; and
wherein said step of determining whether at least one read or write command is pending for said at least one destination physical target includes determining from said resource table whether a transfer ready signal is available from said at least one destination physical target.

11. The method of claim 10, wherein:
said number of transfer ready signals is at least one of a number of XFER—RDY information units and a number of R2T packet data units.

12. The method of claim 1, further comprising:
locking said at least one destination physical target when a read or write command is pending for said at least one destination physical target;
wherein said step of determining whether at least one read or write command is pending for said at least one destination physical target includes determining whether said at least one destination physical target is locked.

13. The method of claim 1, further comprising:
queuing said synchronization command if it is determined that at least one read or write command is pending for said at least one destination physical target.

14. The method of claim 1, wherein:
said mirrored virtual target includes a mirrored virtual logical unit.

15. The method of claim 1, wherein:
said at least one destination physical target is a physical logical unit.

16. The method of claim 1, wherein:
said at least one destination physical target is at least one storage subsystem.

17. The method of claim 16, wherein:
said at least one destination physical target is at least one physical device; and
said step of determining whether at least one read or write command is pending for said at least one destination physical target includes determining whether a read or write command is pending for a logical unit of said at least one physical device.

18. The method of claim 1, wherein:
said at least one destination physical target is at least one physical device; and
said step of determining whether at least one read or write command is pending for said at least one destination physical target includes determining whether a read or write command is pending for a logical unit of said at least one physical device.

19. The method of claim 1, wherein:
said synchronization command includes at least one of a synchronization write command, a synchronization read command, and a synchronization verify command.

20. A storage switch, comprising:
a memory for maintaining an indication of whether at least one read or write command is pending for at least one physical target provisioned as a member of a mirrored virtual target; and
at least one processing unit in communication with said memory that determines from said memory whether at least one read or write command is pending for said at least one physical target and the storage switch and provides a synchronization command to write data from a source target to said at least one physical target only if no read or write command is pending to avoid deadlock;
wherein said at least one physical target includes a source physical target provisioned as a first member of said mirrored virtual target, said source physical target comprising said source target, and at least one destination physical target provisioned as at least one second member of said mirrored virtual target;
said memory maintains an indication of whether at least one read or write command is pending for said source physical target and for said at least one destination physical target;
said storage switch provides said synchronization command to said at least one destination physical target only if no read or write commands are pending for said source physical target and said at least one destination physical target;
said at least one processing unit includes a first processing unit in communication with said source physical target and at least one second processing unit in communication with said at least one destination physical target, said first processing unit updates said memory to indicate that a read or write command is pending for said source physical target if a first success response is provided, and said at least one second processing unit updates said memory to indicate that a read or write command is pending for said at least one destination physical target if a second success response is provided;
an internal initiator that provides a first request to said first processing unit to determine whether at least one read or write command is pending for said source physical target and at least one second request to said at least one second processing unit to determine whether at least one read or write command is pending for said at least one destination physical target;
said first processing unit returns said first success response to said internal initiator if no read or write commands are pending for said source physical target and returns a first failure response to said internal initiator if at least one read or write command is pending for said source physical target;
said at least one second processing unit returns at least one second success response to said internal initiator if no read or write commands are pending for said at least one destination target and returns at least one second failure response to said internal initiator if at least one read or write command is pending for said at least one destination physical target; and
wherein said internal initiator sends a first abort command to said first processing unit if said first success response is provided and said at least one second failure response is provided, and sends a second abort command to said at least one second processing unit if said at least one second success response is provided and said first failure response is provided.

21. The storage switch of claim 20, wherein:
said storage switch provides said synchronization command to said at least one physical target only if said at least one processing unit determines that no commands are pending for said at least one physical target.

22. The storage switch of claim 20, wherein:
said at least one processing unit updates said memory to indicate that a read or write command is pending for said at least one destination physical target if one of said first or second success responses is provided.

23. The storage switch of claim 20, wherein:
said internal initiator again provides said request to said at least one processing unit if one of said first or second failure responses is received.

24. The storage switch of claim 20, wherein:
said internal initiator includes a central processing unit.

25. The storage switch of claim 24, wherein:
said central processing unit includes at least one of a copy service manager and a verification service manager.

26. The storage switch of claim 20, wherein:
said memory includes a first memory in communication with said first processing unit and a second memory in communication with said at least one second processing unit;
said first memory maintains an indication of whether at least one read or write command is pending for said source physical target; and
said second memory maintains an indication of whether at least one read or write command is pending for said at least one destination physical target.

27. The storage switch of claim 20, wherein:
said first processing unit updates said memory to indicate that no read or write commands are pending for said source physical target if said first abort command is received; and
said at least one second processing unit updates said memory to indicate that no read or write commands are pending for said at least one destination physical target if said second abort command is received.

28. The storage switch of claim 20, wherein:
said memory maintains a table including said indication of whether at least one read or write command is pending for said at least one destination physical target, said indication includes a value indicative of a number of transfer ready signals available from said at least one destination physical target, said value having a maximum value indicative of a maximum number of transfer ready signals available from said at least one destination physical target;
said internal initiator sends a command to said at least one processing unit to decrement said maximum value to one prior to providing said request; and
said at least one processing unit determines whether at least one read or write command is pending for said at least one destination physical target by determining from said table whether said at least one destination physical target has an available transfer ready signal.

29. The storage switch of claim 20, wherein:
said synchronization command includes at least one of a synchronization write command, a synchronization read command, and a synchronization verify command.

* * * * *